(12) United States Patent
Aizman et al.

(10) Patent No.: US 8,533,231 B2
(45) Date of Patent: Sep. 10, 2013

(54) CLOUD STORAGE SYSTEM WITH DISTRIBUTED METADATA

(75) Inventors: Alexander Aizman, Mountain View, CA (US); Caitlin Bestler, Sunnyvale, CA (US)

(73) Assignee: Nexenta Systems, Inc., Santa Clara, CA (US)

( * ) Notice: Subject to any disclaimer, the term of this patent is extended or adjusted under 35 U.S.C. 154(b) by 49 days.

(21) Appl. No.: 13/209,342

(22) Filed: Aug. 12, 2011

(65) Prior Publication Data

US 2013/0041872 A1 Feb. 14, 2013

(51) Int. Cl.
*G06F 7/00* (2006.01)
*G06F 17/30* (2006.01)
*G06F 12/00* (2006.01)

(52) U.S. Cl.
USPC .......................................... 707/793; 707/827

(58) Field of Classification Search
USPC .................................................. 707/827, 793
See application file for complete search history.

(56) References Cited

U.S. PATENT DOCUMENTS

| 7,266,645 | B2 * | 9/2007 | Garg et al. | 711/133 |
| 7,480,782 | B2 * | 1/2009 | Garthwaite | 711/170 |
| 7,840,618 | B2 * | 11/2010 | Zhang et al. | 707/827 |
| 8,185,715 | B1 * | 5/2012 | Chow et al. | 711/170 |
| 8,229,899 | B2 * | 7/2012 | Anderson et al. | 707/690 |
| 8,392,370 | B1 * | 3/2013 | Whitney et al. | 707/640 |
| 2008/0005175 | A1 * | 1/2008 | Bourke et al. | 707/104.1 |
| 2010/0042790 | A1 | 2/2010 | Mondal et al. | |
| 2010/0191783 | A1 * | 7/2010 | Mason et al. | 707/822 |
| 2010/0199042 | A1 * | 8/2010 | Bates et al. | 711/114 |
| 2010/0211781 | A1 * | 8/2010 | Auradkar et al. | 713/168 |
| 2010/0332401 | A1 * | 12/2010 | Prahlad et al. | 705/80 |
| 2011/0022566 | A1 | 1/2011 | Beaverson et al. | |
| 2011/0040732 | A1 | 2/2011 | Anglin et al. | |
| 2011/0072059 | A1 | 3/2011 | Guarraci | |
| 2011/0099200 | A1 | 4/2011 | Blount et al. | |
| 2011/0153570 | A1 | 6/2011 | Kim | |
| 2011/0153606 | A1 | 6/2011 | Kim et al. | |
| 2011/0196822 | A1 * | 8/2011 | Zunger et al. | 707/609 |
| 2011/0196900 | A1 | 8/2011 | Drobychev et al. | |
| 2011/0252071 | A1 * | 10/2011 | Cidon | 707/802 |
| 2012/0310982 | A1 * | 12/2012 | Jennery et al. | 707/781 |
| 2012/0330894 | A1 | 12/2012 | Slik | |

OTHER PUBLICATIONS

Weimin Zheng, et al., "Design a cloud storage platform for pervasive computing environments," Cluster Computing, Kluwer Academic Publishers, Bo, vol. 13, No. 2, Nov. 15, 2009, pp. 141-151.

(Continued)

*Primary Examiner* — Charles Lu
(74) *Attorney, Agent, or Firm* — Sawyer Law Group, P.C.

(57) ABSTRACT

A method and system is disclosed for providing a cloud storage system supporting existing APIs and protocols. The method of storing cloud storage system (CSS) object metadata separates object metadata that describes each CSS object as a collection of named chunks with chunk locations specified as a separate part of the metadata. Chunks are identified using globally unique permanent identifiers that are never re-used to identify different chunk payload. While avoiding the bottleneck of a single metadata server, the disclosed system provides ordering guarantees to clients such as guaranteeing access to the most recent version of an object. The disclosed system also provides end-to-end data integrity protection, inline data deduplication, configurable replication, hierarchical storage management and location-aware optimization of chunk storage.

18 Claims, 20 Drawing Sheets

(56) References Cited

OTHER PUBLICATIONS

Sage A. Weil, et al., "Ceph: A Scalable, High-Performance Distributed File System," Mar. 2006, Santa Cruz, 14 pages.

"Protect Your Data from RAID," Caringo, Inc., White Paper, Jul. 2011, pp. 1-18.

Derek Gascon, "Content Storage for a New Millennium," Caringo, Inc., White Paper, Mar. 2008, pp. 1-9.

"CAStor Application Guide," Version 3.0.2, Caringo, Inc., Jul. 2009, pp. 1-34.

Konstantin Shvachko, et al., "The Hadoop Distributed File System," Mass Storage Systems and Technologies (MSST), 2010 IEEE 26th Symposium on, May 3-7, 2010, Sunnyvale, California USA, pp. 1-10.

Sanjay Ghemawat, et al., "The Google File System," SOSP—03 Proceedings of the nineteenth ACM symposium on Operating systems principles, Dec. 2003, pp. 29-43.

The Extended European Search Report issued Dec. 10, 2012 for European Application No. 12179570.2.

* cited by examiner

CLOUD STORAGE SYSTEM WITH DISTRIBUTED METADATA

FIELD OF THE INVENTION

The present invention generally relates to storage systems supporting cloud storage system protocols and providing inline distributed deduplication services.

BACKGROUND OF THE INVENTION

Definitions

Enhanced chunk server (ECS): A server within a cloud storage system that stores and retrieves chunks, which are portions of files. An ECS differs from a block oriented server, such as a pNFS block server or an iSCSI target, in that chunks are identified by name rather than by a logical unit number and block number. This requires the ECS to provide its own local directory and free space management services.

Cloud Storage Access Module (CSAM): A class of components found in embodiments of the present invention and in other cloud storage systems. The CSAM supports existing APIs and/or wire protocols by translating them to a product specific protocol. It will frequently also support specific processing requirements such as the application of hash functions to object/file names and/or payload.

Cloud Storage System (CSS): A system for accessing stored files or objects via a set of servers. Cloud storage systems differ from traditional NAS servers by use of new protocols (with many using HTTP derived protocols), optimization for internet access and emphasis on whole file get/put semantics.

Consistent Hash: A hashing algorithm that hashes multiple instances of each server instance to a conceptual circle, and then hashes each resource to the same circle. The resource is then assigned to the next N servers moving around the circle from where the resource hashes. It is used in many systems with a large number of servers where failure of at least one server is a frequent occurrence.

Google File System (GFS): One example of a cloud storage system.

Hadoop Distributed File System (HDFS): One example of a cloud storage system.

L3: Layer 3 of a network stack under the ISO model. The most common L3 is the Internet Protocol, either V4 or V6. InfiniBand also includes an L3.

L4: Layer 4 of a network stack under the ISO model. TCP, UDP and SCTP are L4 transport protocols used with IP. For all three an L4 identifier is a port number. InfiniBand also includes L4 functionality. An InfiniBand L4 identifier is a Service ID.

Metadata Server: A component of many distributed file systems, including most cloud storage systems. A metadata server tracks only the metadata for objects/files stored. Actual storage of object/file payload is performed by a chunk server or Block Servers under direction of the metadata server.

Network Attached Storage (NAS): Network-attached storage (NAS) is file-level computer data storage connected to a computer network providing data access to heterogeneous clients. NAS not only operates as a file server, but is specialized for this task either by its hardware, software, or configuration of those elements. NAS is often made as a computer appliance—a specialized computer built from the ground up for storing and serving files—rather than simply a general purpose computer being used for the role.

OpenStack Swift: An example of a cloud storage system created by the OpenStack open-source project.

Secure Hash Algorithm: A Secure Hash Algorithm is one of a number of cryptographic hash functions published by the National Institute of Standards and Technology as a U.S. Federal Information Processing Standard.

SHA-256: A specific protocol from the Secure Hash Algorithm family of cryptographic algorithms.

SHA-512: A specific protocol from the Secure Hash Algorithm family of cryptographic algorithms.

ZFS: A copy-on-write file system developed by Sun which features end-to-end data integrity.

BACKGROUND

Recently several solutions have been introduced that are described as "cloud storage systems". These solutions are generally not presented as an evolution of the traditional model for network file access, but rather as a radical departure from it.

Cloud storage systems, such as the Google File System, Amazon S3 (Simple Storage Service) or Hadoop's HDFS (Hadoop Distributed File System) achieve greater performance for certain applications by radically re-assessing some of the challenges of conventional Network Attached Storage (NAS) solutions as described below:

Hierarchical directories are typically replaced with a simple one layer container, frequently called a bucket. The files have an "object name" which is a flat name within the single container. For the benefit of those organizing the files the files can still have the traditional directory separators (typically the forward slash "/"). In this way tens of thousands of files can still appear to be in organized in "directories", but can be indexed with a single layer lookup using the vastly improved memory capacity of current servers.

The complex requirements to support shared access to files have been replaced with a simple single-writer model. Files are only shared after they have been updated, not while they are being updated. Specifically, the single writer must close the file before other users can access the new contents. Once a version of a file is put, it is never modified and only occasionally deleted. It may be superseded by later versions of the same file. Prior versions of the file continue to be available on request, and the current version remains the default version until a new version is completely put by its creator. Expunging of old versions is controlled by administrative policy rather than user actions. Readers of a file retrieve the entire payload from a single version, even if a later version becomes available before they have completed their read.

Random access is no longer supported, or is at least not the focus of such systems. Writes either replace the entire payload of a file, or are appended to its end of the file. Read access can be optimized assuming the reader will serially access the entire file.

Conventional implementations of cloud storage systems typically have the following components:

One or more metadata servers.

The metadata servers are responsible for naming and tracking the other metadata about each cloud storage system object (CSS object), but not responsible for storing any of the data. In conventional implementations there is only a single active metadata server, or there is a set of metadata servers where a client selects which metadata server to interact with based upon a hashing algorithm that assigns each CSS object to exactly one active metadata server. The existing embodiments describe the metadata server using a variety of labels, including metadata server, Name Server and Name Node.

A larger number of chunk servers.

The chunk servers are responsible for storing chunks of files, while the metadata servers retain the information on how to merge these chunks into various files. The chunk server differs from a simple block server, such as may be used in a pNFS implementation, in that each chunk server is responsible for maintaining its own free lists and otherwise managing the storage resources assigned to it. Many chunk servers will support RAID and/or creation of multiple copies without consuming network bandwidth. The existing embodiments describe chunk servers using a variety of labels, including Chunk Server, Object Storage Daemon, Block Server, Data Server and Data Node.

One or more Cloud Storage System Modules (CSAM) provides file system services to clients using Cloud Storage System APIs (CSS-API) and/or wire protocols (CSS-protocol). CSAMs that support CSS-APIs are typically deployed as user-mode libraries, those that support CAS-protocols are typically deployed as servers or proxies.

Conventional cloud storage systems generally do not offer the latest features of NAS systems. They typically do not have a distributed name space, relying instead on a single active metadata server. Those that do support multiple metadata servers have the client select the metadata server based on a hash algorithm. This contrasts with the ability of NAS protocols such as NFSv4 to precisely control which metadata server within a federated set of file servers is the primary home for each directory within a global namespace.

Conventional cloud storage systems rely on simple replication of data with only limited methods to detect latent sector errors, commonly referred to as bit rot, or otherwise provide for self-healing data. While many provide simple data integrity of the individual chunks, none provide full-file complete data integrity protection using high quality fingerprinting algorithms such as SHA-256 or SHA-512. Conventional cloud storage systems do not provide end-to-end fingerprint protection comparable to the level of protection provided by some local file systems (e.g. ZFS).

Conventional cloud storage systems do not have integrated inline distributed deduplication. Deduplication, if done inline, is performed after the client transfers the data to the cloud storage system, or may not be done at all before a non-deduplication eligible copy is created and committed.

Further, conventional cloud storage systems have been focused on support for very large files, which meets the needs of the initial map/reduce applications that inspired their development. Large files are the only kind of file that map/reduce applications require, but these large files do not necessarily meet the needs of the wider market. The focus on very large files has enabled conventional cloud storage systems to be designed where the entire metadata for a system is memory resident on a single metadata server. Such a design provides excellent performance, but at the cost of placing a severe limit on the scalability of the metadata.

Requiring a cloud storage system to store the entire metadata in memory for a single server system constrains the capacity of the file system. This constraint is typically met by limiting support for small files or at least small chunks. Applications that would benefit from the get/put semantics of a cloud storage system but require small files can only be supported if they also limit the total number of files within the file system.

Some implementations have addressed this issue by deploying a cluster of metadata servers and then applying client-driven hash algorithms to assign CSS objects to specific metadata servers. This is only a solution when the cluster of metadata servers can be deployed in a location that is easily accessible to all clients. When the clients are physically distributed, for example in different branch offices within a corporate intranet, being able to communicate with a local metadata server would be a preferable solution. Even within a single location, there can be major network performance and latency benefits to accessing a metadata server on the same chassis or rack. Hash-driven selection of the metadata server does not allow for selecting a metadata server to optimize network access.

OpenStack Swift file system is a slight variation on the solutions described so far. A Swift proxy server serves the role of the CSAM. It stores either files or segments of files to object servers that serve the same role as chunk servers. Aggregated files are represented by manifests which are returned as metadata in HTTP operations. Each file or segment name is hashed to a partition number. The mapping of partitions to object servers is a shared configuration distributed to the proxy servers. The Swift proxy servers then put the file or segments to the correct object servers directly and only complete the transaction to their client when two out of three object servers have successfully completed the transaction.

This solution relies solely on the Swift proxy servers to properly construct the manifest of segments in the file. The integrity of the stored files or servers may be checked by the object servers, but is not checked on an end-to-end basis other than by the network transport protocol. A solution that provided better end-to-end integrity checking of the entire file would be preferable.

The OpenStack Swift file system also relies on the Swift proxy server to complete the file or segment put to each zone that the hash-selected partition is replicated to. When the zones span multiple sites this can involve long-haul latencies on every put transaction. A preferable solution would minimize the critical portion of a put transaction that needed to be executed on multiple sites.

Conventional cloud storage systems rely on the CSAMs to execute chunk puts as instructed by the metadata server with little or no validation being performed by the chunk server that the chunk puts being requested are exactly the ones specified by the metadata server. Once a CSAM has been authenticated it is assumed that all of its operations are valid. This assumption can make the end-to-end integrity of the cloud storage system as weak as the most undermined or least poorly updated client interface.

A solution that guarded against malicious or mistaken chunk puts to the chunk server would be desirable. If either the client or CSAM participate in the deduplication process, it is essential that the end-to-end storage system integrity be protected from client malice or mistakes.

The lack of integrity enforcement and limits on metadata scalability can be a barrier to deployment of cloud storage systems for applications that would benefit from the simplified get/put semantics, but which require a very large number of relatively small files. Examples include a corporate document repository, especially if it includes in-progress documents, and email servers.

In conventional implementations these components typically implement a client get of a CSS objects as follows:

A. As a result of a client request the CSAM issues a get request to the metadata server. This request will explicitly or implicitly identify an outer container or 'bucket' and the flat object-name of the CSS object desired within that container. The request may specify a specific version of the file/object desired, or default to the most recently committed version.

B. The metadata server validates the access to the data, and if approved responds with a list of chunks that the CSAM must access to obtain the file payload.

C. The CSAM issues chunk get requests to the identified chunk server, potentially in parallel.

D. The chunk server supplies the chunks requested.

E. The CSAM forwards the received chunks as they are received to the client and indicates completion of the request to its client.

Conventional implementations of these components may implement a client put of a CSS object in one of three fashions, a centralized put strategy, a decentralized put strategy and a local put strategy. Each of these strategies will be discussed below.

In a centralized put strategy the CSAM issues a put request to the metadata server that includes the data, the metadata server is responsible for chunking the object and delivering the chunks to at least one chunk server. Delivering chunks may be done on a cut-through basis as the object is received, or only after the entire object has been received. A background replication process will then bring the number of replicas up to the required minimum. The acknowledgement may be deferred until the minimum number of copies is created.

In a decentralized put strategy the CSAM asks for the identity of chunks that it should create. The metadata server replies with the chunk identifiers that should be used to create new chunks, and on which chunk server. When distributed deduplication is supported, the client will supply the fingerprint of each chunk first. The metadata server will only tell it to store the chunk if it is a unique chunk not previously seen. After the chunk servers are identified, the CSAM puts the chunks to the specified destinations. This may include creating the minimum number of replicas immediately. Lastly the CSAM confirms that the puts have completed to the metadata server.

In a local-put strategy: the CSAM accumulates a chunk on its own local file system, and then requests allocation of a chunk so it can be entered into the cloud storage system. After all chunks have been received, the metadata server co-ordinates replication of the chunk to the required number of copies. Replication may be deferred until the file has been closed.

A limitation on reliance on memory retention of metadata is that a server memory has relatively meager protection against undetected memory errors. While typically backed up with a reliable transaction journal, there is only limited proactive detection of memory corruption. Typically the transaction journal is only applied when a system rebuild is required.

Advanced file systems, such as the ZFS file system, feature end-to-end data integrity protection with sophisticated fingerprinting of data and metadata at each layer of the file system. Latent storage errors are detected automatically and corrected. A solution that provided this level of protection to the cloud storage system metadata would be desirable.

Simplification of the complex file sharing semantics of conventional NAS systems is desirable. However, there are potential get/put semantics that are more complex than what conventional cloud storage systems offer that would be desirable for document storage systems.

A first example of such semantics would allow a client to perform a read-only get of the current file, and then check that this was still the current version when it attempted to put a new version. If another client had updated the file in the interim the put would be disallowed, the application could then fetch the new current version, compare it with the version that the client had prepared and propose a merger of the two sets of changes.

A second example of such semantics would allow a client to lock down the right to create the next version of a CSS object, so anyone else attempting to access the CSS object for write would get an error.

Hierarchical Storage Management (HSM) is a conventional technique where the storage resources allocated for a particular file can evolve over time without changing the contents of the file or the file name used to reference it. When a file is new HSM may extensively replicate the file both for protection and to facilitate heavy parallel access. As that same file becomes older an HSM system may migrate the file so that protection of its payload is provided by offline archives, such as tapes, rather than top-grade hard drives. Integration of HSM features into a cloud storage system would be of value in supporting applications that need to archive documents over an extended time period.

When any file system, including a cloud storage system, is employed to manage documents, there can be a very low portion of the total retained object versions that are being referenced. Month old emails must be retained, but are seldom accessed. Documents are intensely edited and reviewed, then distributed and then only seldom referenced. With a conventional cloud storage system the metadata for these infrequently referenced object versions would be consuming memory resources on the metadata servers. A preferable solution would to allow the metadata supporting a given object version to be moved to cost-effective solutions as the referenced object version ages. No information is lost if the metadata for a year old document can only be accessed with a disk read, only latency on a very infrequent transaction. Because they were not designed for document retention the conventional cloud storage systems do not address this need.

Accordingly, what is desired is a system and method for addressing the above-identified issues. The system and method should be cost-effective, adaptable, and easily implemented in existing systems. The present invention addresses such a need.

SUMMARY OF THE INVENTION

A method and system is disclosed for supporting a practically unlimited number of Cloud Storage clients (i.e., clients accessing storage using cloud storage system protocols and APIs), while also providing all the features of the best of art traditional file systems, including end-to-end data integrity, self-healing data, as well as inline distributed deduplication. The system and methods are specifically designed with the goal of allowing scaling of the total metadata required for a cloud storage system by splitting the metadata between object-tracking and chunk-tracking metadata, and then allowing each set of metadata to be efficiently stored by a plurality of metadata servers in their local file systems. The object-tracking metadata is shared as a federated file system with a global name space with specialized mechanisms to replicate object metadata. The chunk-tracking metadata is shared as a distributed database that is optimized based on network topology. Greater scaling is achieved by distributing metadata processing, relying on solid state drives (SSDs) or other high speed non-volatile memory to store metadata in local file systems and by tailoring which portions of the metadata each server needs to retain.

A method and system in accordance with the present invention distributes the functionality of the metadata server while still supporting existing CSS APIs and CSS protocols. By distributing the functionality of the metadata server and by encoding the metadata within advanced local file systems, the scaling limitations of metadata are eliminated. This enables support for cloud storage systems with small chunks or files. A method and system in accordance with the present invention further brings distributed deduplication functionality and benefits developed for conventional, or "POSIX", file systems including end-to-end data integrity, self-healing data and hierarchical storage management features.

DETAILED DESCRIPTION OF THE INVENTION

Figure 1:
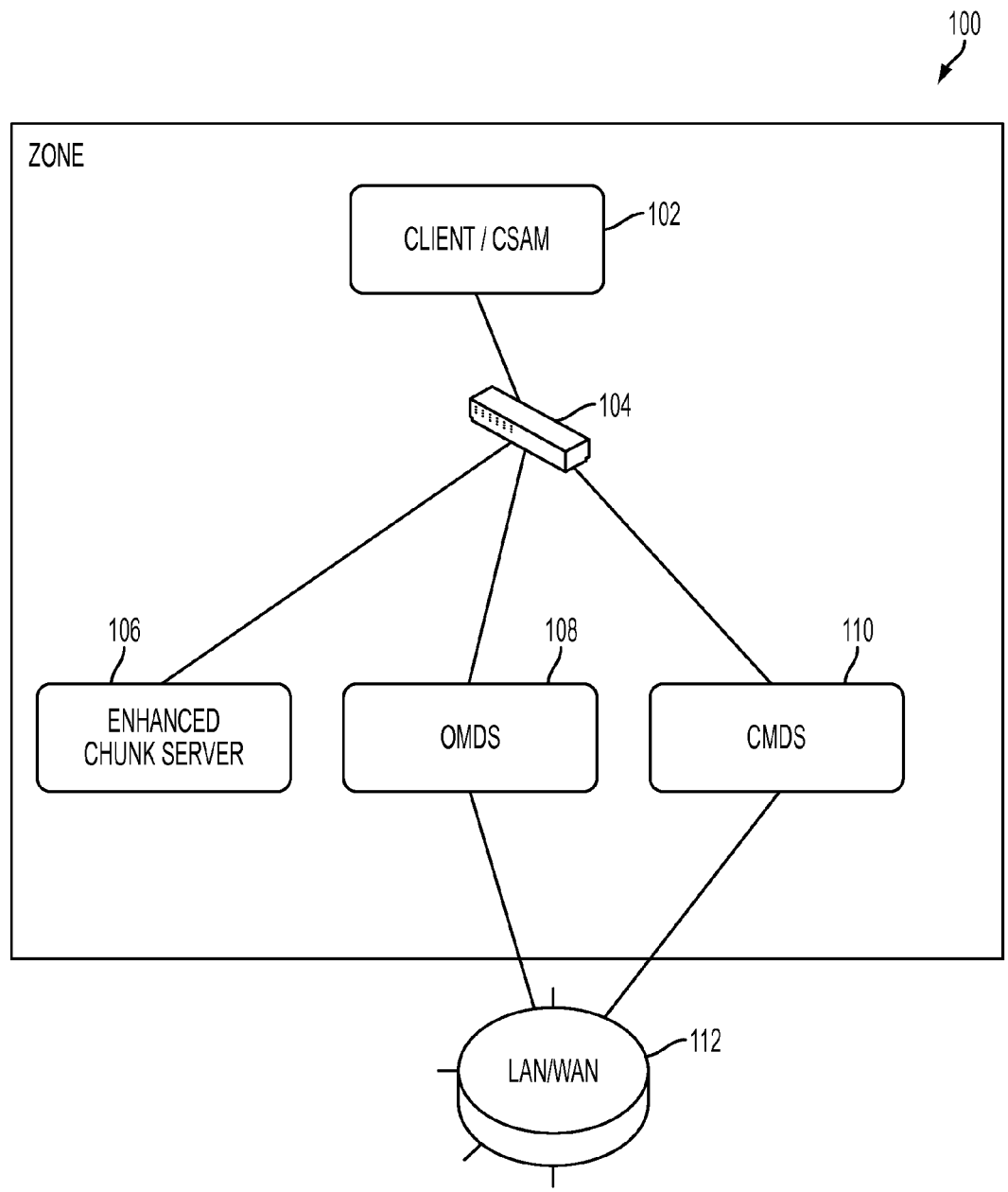
FIG. 1 is a block diagram of a system in accordance with the present invention.

The present invention generally relates to storage systems supporting cloud storage system protocols and providing inline distributed deduplication services. The following description is presented to enable one or ordinary skill in the art to make and use the invention and is provided in the context of a patent application and its requirements. Various modifications to the preferred embodiments and generic principles and features described herein will be readily apparent to those skilled in the art. Thus, the present invention is not intended to be limited to the embodiments shown, but is to be accorded the widest scope consistent with the principles and features described herein.

A system and method of organizing, storing and processing the metadata associated with a cloud storage system keeps the simplified get/put semantics but removes potential bottlenecks on the rate of metadata operations and/or the capacity of the metadata retained in a monolithic fashion by any one metadata server. This system and method of organizing CSS object metadata allows the metadata processing and storage requirements to be distributed across multiple servers and to be split between two sub-systems. These techniques are especially relevant for document storage systems.

CSS object metadata is tracked in two independent sub-systems, one for specifying CSS objects as a collection of CSS chunks and the second for tracking the locations of CSS chunks. Reliably handling the CSS object metadata in these two sub-systems is based on the following techniques:

A. Unique chunk identifiers. Each chunk of a CSS object has a unique permanent chunk identifier. A given permanent chunk identifier maps to one set of payload. The payload that a permanent chunk identifier refers to will never vary over time; once a permanent chunk identifier is assigned it will never reference an alternate payload. Unlike conventional cloud storage systems there can never be an out-of-date chunk replica on any of the enhanced chunk servers (ECS). The chunk identifiers also enable end-to-end data integrity protection of the CSS chunks.

B. Chunk cookies are returned by ECS for each chunk put, even if a chunk is a duplicate. The chunk cookie encodes the permanent chunk identifier and context information so that the complete CSS object commit can be validated.

C. Active intelligent servers do more than just store the metadata assigned to them. The CSS object metadata server (OMDS) implements a shared global name space using distributed NAS protocols, but using very specific replication algorithms.

D. Reference tracking information is published by the object metadata tracking servers that enables the chunk-tracking metadata servers to determine when a CSS chunk is no longer needed. Otherwise the two sets of metadata are not interdependent. The chunk-tracking metadata does not know which objects the chunks are used in, and the object-tracking metadata does not know which ECS store the CSS chunks.

A system and method in accordance with present invention differs from conventional cloud storage systems in how it organizes, distributes and stores the cloud storage system metadata. These differences are detailed below.

A. The metadata is cleanly divided between information about CSS objects and information about CSS chunks.

B. Servers are identified within zones, and chunk storage is optimized based upon these zones. A zone is a subset of a network. In the present invention, favoring traffic within the zone over traffic between zones will optimize network performance and/or robustness. Typically zones are identified by IP subnets, but can also be administratively configured. Examples of zones would include a specific site within a multi-site corporate intranet and a specific rack with a top-of-rack switch.

C. The default assignment of chunks to ECS within a zone is performed using a consistent hashing algorithm, which is a technique already employed by some cloud storage systems. But it is supplemented with a referral mechanism to allow overloaded ECS to delegate storage of chunks to other ECS within the local zone.

D. The metadata is stored in local files systems that have been selected and configured to make them suitable for reliable retention of metadata. The specific requirements will be described later in the specification.

E. Distribution of transaction processing combined with the use of solid state drives (SSD) by a local file system is relied upon to provide sufficient metadata transaction processing speeds. Conventional cloud storage systems have relied on fully encoding the metadata within memory to achieve the required transaction processing speeds. Placing all metadata within memory is a particularly poor implementation strategy for document storage systems where the ratio of inactive to active versions can be very high.

F. The object metadata forms a global name space which can be collectively published as a distributed NAS file system for reference by components of the present invention. The OMDS has full read-only access to the object metadata. Combined with its own chunk tracking data this enables the ECS to perform long-term maintenance tasks such as detection and deletion of orphaned chunks.

The local file systems used in accordance with the present invention are selected and/or configured to provide for: efficient name resolution within large directories, replication and/or striping to protect against data loss, and providing end-to-end integrity when storing metadata by checking to protect the metadata against passive data errors, using any ability of the local file system to edit the storage profile of an existing file without renaming the file.

The cloud storage system provides its own end-to-end integrity checking for the CSS chunks themselves. Therefore, this feature is not required for the ECS.

In an embodiment, the delivery of cloud storage services is organized within one or more zones. There are numerous well-known methods for configuring zones, any of which may be selected in a given deployment. This includes using the techniques standardized by the IETF as the "zeroconf" protocols to identify other servers in the same IP subnet and treating each IP subnet as a zone.

Whichever technique is selected, it must include the assignment of a permanent identifier for each server that is a component of the present invention. This identifier must be unique within the zone. A single identifier must be assigned no matter how many network interfaces a server has. A server with four L3 addresses does not have four times as many replicas of the chunks or metadata it holds. The identifier enables encoding of the set of servers where a given piece of data is stored that is independent of the L3 address or addresses that a server is using.

In this description of embodiments of the present invention, there will be detailed descriptions of sequences of exchanges between the components of the invention to achieve a specific feature. Each interaction represents a message sent from one component to another. When the components are not co-located this will be done within the context of a reliable network connection that is part of a resilient session. The requirements for these sessions will be described later in this document. When components are co-located the exchanges may be communicated via a loopback device or with any other form of inter-process communication that the platform provides.

FIG. 1 is a block diagram of a system 100 in accordance with the present invention. The system 100 includes one or more cloud storage modules (CSAMs) 102, one or more object metadata servers (OMDS 108), one or more chunk metadata servers (CMDS) 110, one or more enhanced chunk servers (ECS) 106, network elements to connect the components within the zone (104) and over the broader WAN/LAN network (112).

The one or more CSAMs 102 each implement a Cloud Storage System API (CSS-API) or wire protocol (CSS-protocol) for one or more end clients. In most deployments the API and/or protocol in use will have been designed for other cloud storage systems. In some embodiments a CSAM 102 will be a user-mode library serving a single client. In others it may be a virtual machine serving a set of clients as a proxy on the same host as the clients. The CSAM 102 may also be embodied within an appliance that also houses other components of the present invention.

The one or more OMDS 108 track metadata and maintain a global name space of CSS object metadata files. The CSAM 102 establishes a session with a single OMDS 108. The OMDS 108 are a set of collaborating intelligent servers that rely on the other servers in the set implementing the same set of rules for replicating CSS object metadata and for archiving inactive version metadata to external archive services.

The one or more CMDS 110 each track the location of chunks within the ECSs 106 that are within a zone assigned to the CMOS 110. Each CMOS 110 also tracks which external archive services have been used to archive chunks.

The one or more ECSs 106 store and provide access to CSS chunks. Typically there would be multiple ECSs 106 within each zone. The goal is to balance the number of IO operations that the ECSs 106 can support in aggregate with the number of IO operations the metadata servers can support. As the data to metadata ratio increases, so will the ECSs 106 to metadata server ratio. As the data to metadata ratio increases, the chances of deploying SSDs to store data decreases. This requires more ECSs 106 for each metadata server. The ECSs 106 offload certain processing responsibilities from the CSAMs 102. An ECS 106 may be instantiated as a proxy that performs the enhanced functionality wrapped around accessing a conventional chunk server 106.

The OMDS 108 implements a federated file system with a global name space using a distributed NAS protocol, such as NFSv4 or Microsoft's Distributed File System (DFS). This file system is not accessible by clients, but only by the metadata servers within the system.

The object metadata is designed so that it is easily replicated and cached as read-only files. Each CSS object is assigned a specific home server under the distributed NAS protocol. This home server is responsible for serializing the creation of new version numbers for a CSS object. With a guarantee that a new object version has a unique sequentially allocated version number, the process of replicating CSS object metadata files is greatly simplified.

The default set of the ECS 106 to hold each chunk within a zone is determined by a consistent hash algorithm. Some conventional cloud storage systems already employ consistent hash algorithms to assign chunks to ECS 106 or CSS objects to servers. A key feature of a system and method in accordance with the present invention is that the consistent hash algorithm is applied within each zone, and that each chunk metadata server tracks the actual set of ECSs 106 within the zone. Allowing exceptions to the hash algorithm enables redirection to an alternate ECS 106 when a default ECS 106 does not have the capacity for the chunk, and the bandwidth to reply to a request or simply has not yet replicated the chunk yet.

The latter scenario is a natural by-product of a consistent hash algorithm. Consistent hashing as applied to assigning ECSs 106 has each ECS 106 hash its permanent identifier multiple times against a conceptual circle. The non-zone portions of chunk identifiers are hashed against that same circle. Each chunk is assigned to the required number of ECSs 106 found by moving clockwise on the conceptual circle from where the chunk identifier is hashed until the required number of servers has been assigned. When a server is temporarily absent the chunks that it would have been assigned are distributed to the other ECS 106. When the absent server comes back online, the zone's CMOS 110 must start the process of replicating the chunks that it would have been assigned to the restored ECS 106. Placing a redirection marker on the ECS 106 can be accomplished more quickly than replicating the entire chunk.

A system and method in accordance with the present invention can support more metadata than a conventional solution because:

CSS object tracking metadata is encoded for storage in a file system stored or cached on SSD. In one embodiment, this effectively increases the metadata limit from about 32 GB to 1 TB or more. Even if the number of metadata entries per GB drops to $\frac{1}{8}^{th}$, the density there is still a major increase in the metadata capacity. When the local file system supports hierarchical storage management, the metadata for inactive versions can even be assigned to conventional disk drives. This would effectively eliminate any limit on the amount of metadata that could be stored for inactive versions.

Fingerprint validation and generation can be offloaded to the ECS 106. This enables inline deduplication without adding to the processing load on any critical path. Inline deduplication can be a major benefit for document storage systems but adding the computational overhead to a single metadata server would challenge conventional architectures.

Inactive chunks and supporting metadata can be archived to external storage services and re-integrated as needed. The metadata capacity is not consumed by support for old versions. However the data remains available, albeit with increased latency. This capability is a major advantage for document storage systems, where only a very small fraction of the object versions ever created will be accessed during a given day.

Figure 2:
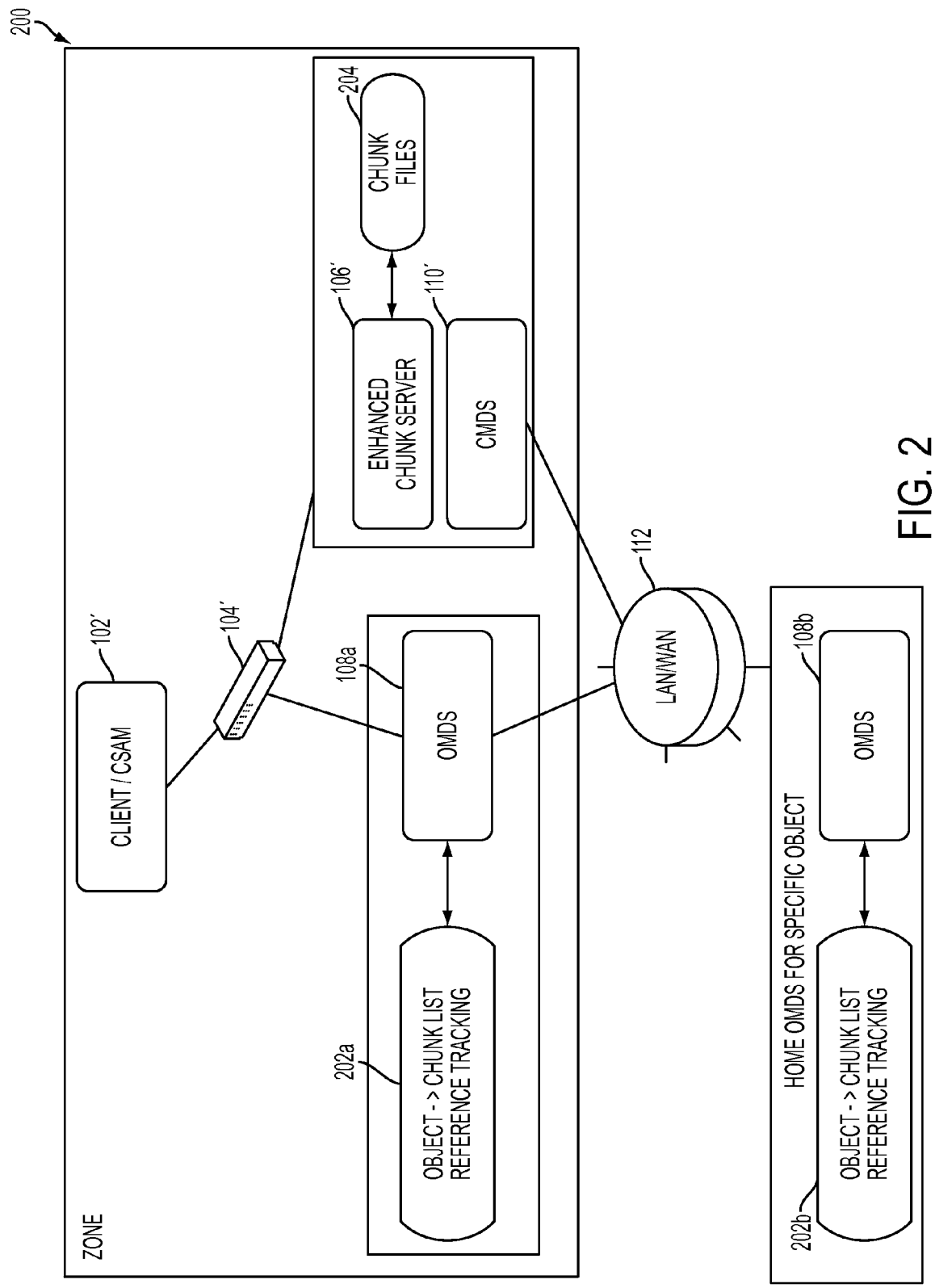
FIG. 2 is a block diagram of how the present invention can be deployed on multiple sites.

FIG. 2 is a block diagram of deployment on multiple sites 200, in accordance with the present invention. Each site operates largely independently with access to the same stored objects. The only critical path synchronization required between sites is the allocation of a new version number of an object. Further the OMDS 108 responsible for that synchronization can be fine-tuned for specific objects or groups of objects using distributed NAS protocol features, such as NFSv4 Referrals.

For example, the system can be configured so that all objects with full object names that start with "/xyz.com/home/marysmith/" will have their version numbers controlled by the OMDS 108' at the site where Mary Smith works. The full flexibility of distributed NAS protocols can be employed for CSS objects.

One feature of a system and method in accordance with the present invention is that the ECS 106' enforces consistency rules regarding the fingerprint of the chunk payload and the identifier used for the chunk. In some CSA-protocols the ECS 106' are not directly visible to the end clients. This requires the CSAM 102' (or a proxy under its control) to assemble payload from the ECS 106' based upon the OMDS 108' supplied chunk list 202a or 202b.

A system and method in accordance with the one or more embodiments uses a method of identifying the chunk files 204 stored by ECS 106, which are designed to support distributed data deduplication.

Chunk files 204 may be identified by three different formats. A chunk identifier concatenates an enumeration of the format selected and a format specific section.

First Format

In a first format, each chunk is identified by a combination of a specified zone of origin, where the chunk was identified and a unique fingerprint of the chunk.

The chunk class of storage is an enumerator identifier of a class of storage where the various system components share the same configuration data for the chunk size and a specification of the RAID and/or replication characteristic to be applied by each ECS 106' for chunks with this chunk class of storage.

A zone of origin is an enumerator of the internet zone that the CSAM 102' or the ECS 106' that calculated the identifier.

A unique fingerprint is derived from the chunk payload after any optional chunk compression has been applied. Embodiments may support a variety of fingerprinting hash algorithms. Each fingerprinting hash algorithm supported must be believed to be effectively immune from preimage attacks. A preimage attack is one where an attacker can generate an image to match an existing fingerprint. With hashing algorithms such as SHA-256 or SHA-512 there are no known methods to generate a payload with a desired fingerprint that do not require or at least approach a near linear brute force attack of serially attempting different plain texts.

If a preimage attack were computationally feasible, an attacker could pollute a deduplication-enabled cloud storage system by posting a phony object with the same fingerprint as an object that it anticipated would be stored. One example exploit would be to store a false ISO image of an OS release. Other users would see that the ISO had already been stored, and then fetch the false ISO image when they wanted to install the OS. Because a cryptographic quality hash fingerprint makes a preimage attack computationally unfeasible, the hash fingerprint can be used as a sufficiently unique identifier for the data.

Second Format

In the second format, each chunk identifier uses a data corruption detection quality fingerprint. This employs a lesser quality hash algorithm to guard against data corruption in the stored image. While less computationally expensive, the hash algorithm may be vulnerable to feasible preimage attacks. Examples of such algorithms would include MD5 and CRC32. This format of chunk identifier is composed of the following elements: an enumerator specifying the specific hashing algorithm used, the hash fingerprint of the compressed data, an enumerator for the zone of origin for the CSAM 102' or the ECS 106', and a unique serial number generated by the CSAM 102' or the ECS 106'.

There are numerous well-known algorithms for partitioning a large set of identifiers amongst a relatively small set of allocating servers, all of which are compatible with the present invention.

Third Format

A third format is a deferred fingerprint format. The format includes the following elements: an indicator which indicates which of the permanent formats the deferred chunk identifier should be eventually replaced with, a checksum of the chunk payload (such as MD5 or CRC32), which will be checked by the receiving ECS 106' unless the chunk is delivered using a transport protocol that has sufficient error detection capabilities itself); and a sequence number generated by the CSAM 102'. The deferred fingerprint is a temporary placeholder for a permanent chunk identifier to be calculated by the ECS 106' later.

There are numerous methods for transforming a binary value into a sequence of characters that form a valid portion of a file name. In one embodiment, each 16-bit portion of the fingerprint would be mapped to three characters using a RADIX-50 encoding. A simpler but slightly less efficient method would be simply representing the value in printable hexadecimal format.

The hash algorithm is applied after the file has been parsed into segments, and after any optional compression has been applied to each chunk, but before any optional encryption is applied. The methods of parsing a file are inclusive of identifying segments in an ongoing input stream. It is not necessary to have received the entire file to segment it.

Basing the hash on the compressed but not yet encrypted payload allows a chunk to be transferred and/or stored in an encrypted fashion, but to be identified based on its compressed plain text.

Figure 3:
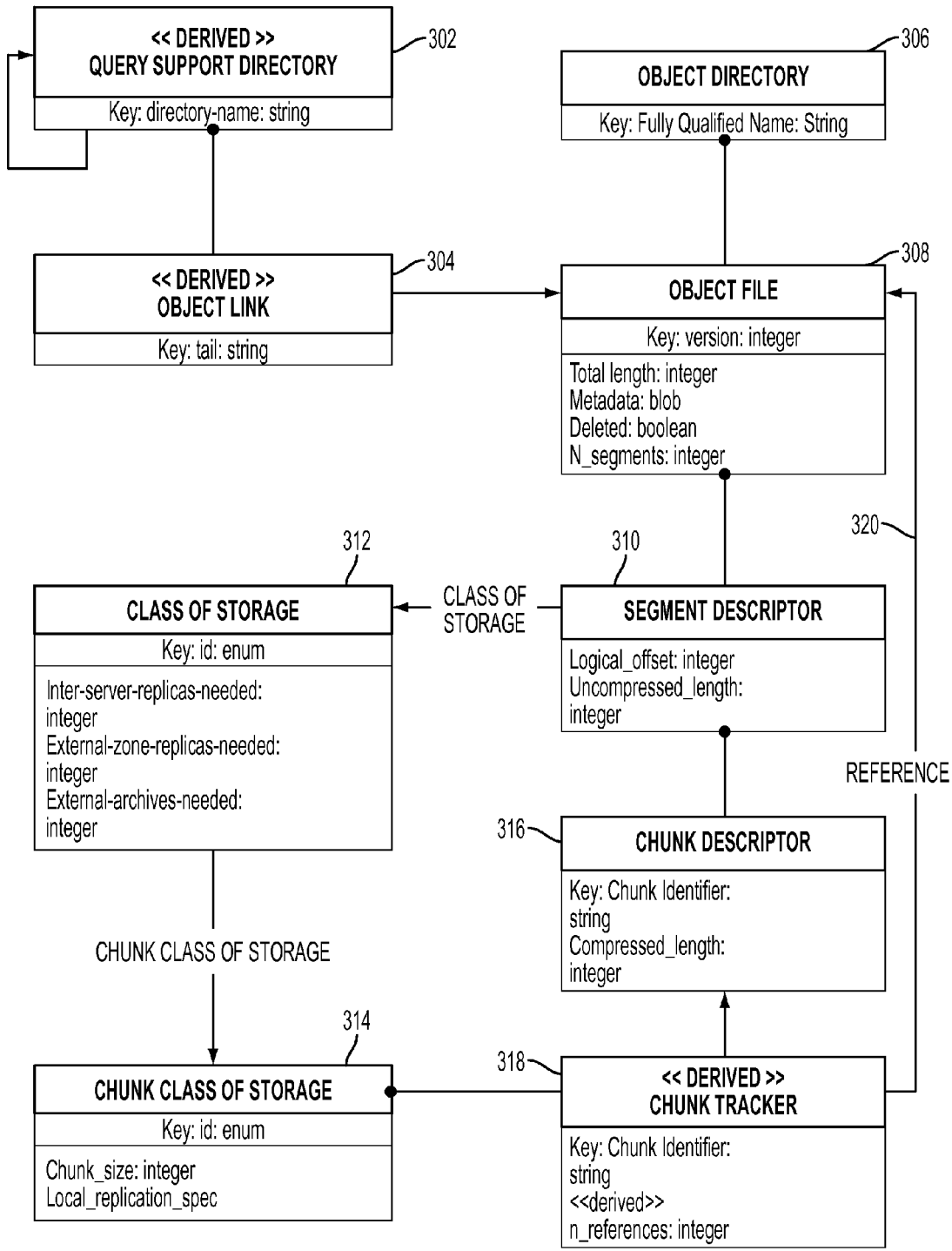
FIG. 3 is a block diagram of how the metadata files are maintained by each OMDS.

FIG. 3 is a block diagram of the metadata that each OMDS 108 maintains within its local file system. The OMDS 108 maintains an object directory 306 in its local file system that corresponds to each unique prefix of a CSS object fully qualified name, where the prefix ends with a conventional directory separator. An object name is fully qualified when enclosing accounts, and/or buckets of the CSS-API or CSS-protocol are concatenated with the object-name. For example, an object named "marysmith/expense_report.xls" that was held in the bucket "/xyz.com/home" would have a fully qualified object name of "/xyz.com/home/marysmith/expense_report.xls". This name would yield directory prefixes for "/xyz.com/", "/xyz.com/home/" and "/xyz.com/home/marysmith/".

That directory contains one or more CSS object metadata files 308. Each file 308 is identified within the context of the Object Directory 306 by its version number.

Each object metadata file 308 encodes the following information on the specific version of an object: the total length of this version of the object before any compression algorithm has been applied, an indication whether this version represents a logically deleted file (a get request that references this version either explicitly or implicitly would obtain a response indicating that the object did not exist), any cloud storage system metadata for the object at this version, and a sequence of zero or more segment descriptors specifying non-overlapping sections of the object that contain non-zero data. These segments are stored in order of increasing offsets.

Each segment descriptor 310 encodes: the chunk class of storage in a shared configuration common with the ECS 106, the logical offset within the object, the length of the uncompressed data of the payload for this segment, a sequence of chunk descriptors 316 covering the chunks that is included in this segment, and a fingerprint checksum of the prior contents.

Each chunk descriptor 316 encodes: the chunk identifier that uniquely identifies the compressed payload for this chunk, and which are stored by one or more ECS 106 and the compressed length of the chunk after any compression algorithm has been applied.

The configuration for a class of storage 312 includes: an inter-zone replication minimum. Replication to multiple zones may be required to guard against natural disasters that may cause an entire zone to fail or become inaccessible, the inter-server-replication minimum which is the number of distinct replicas for this segment that should be created on different ECS 106, and the chunk class of storage 314 that should be used by the ECS 106 storing chunks for segments with this class of storage 314.

The configuration for the chunk class of storage 314 includes: the chunk size (the size that should be allocated for chunk files with this class of storage) and a specification of the replication and/or RAID protection that each ECS 106 should apply.

Each OMDS 108 also maintains a set of derived metadata files based on the information in the CSS object metadata files. These derived metadata files are updated in the same local file system transaction that creates the local object metadata file.

Each metadata archive tracks externally stored archives of a CSS object metadata file. Each metadata archive is named to reflect the external archive service and the version number. The metadata archive encodes the external archive name and any decryption key needed to decrypt the external archive.

The derived metadata files will include a link or identification of the current object metadata file for each object directory that will identify the file with the most recently created version. In the preferred embodiment, this will be a symbolic link within the object directory 306 named "current".

The derived metadata files will include for each chunk class of storage 314 and permanent chunk identifier a reference count (chunk tracker 318) and/or actual enumeration references (chunk reference 320) by object metadata files to this chunk.

In the preferred embodiment each chunk tracker 318 is represented by a directory in the local file system and each chunk reference 320 is a symbolic link to the object metadata file that referenced the chunk. The reference count is the number of entries in the chunk tracker directory.

The derived files may include Query Support Directories that enable efficient queries for object-names. For example, it may be desirable to support queries matching conventional file system hierarchical directory semantics. This would be supported with the following derived files:

A Query Support Directory 302 is created for each derived directory name. This directory 302 includes sub-directories as implied by the conventional parsing of the collective object-names.

Object Links 304, typically implemented as symbolic links, are named for the tail portion of the object name and reference the object-directory for the object.

Figure 4:
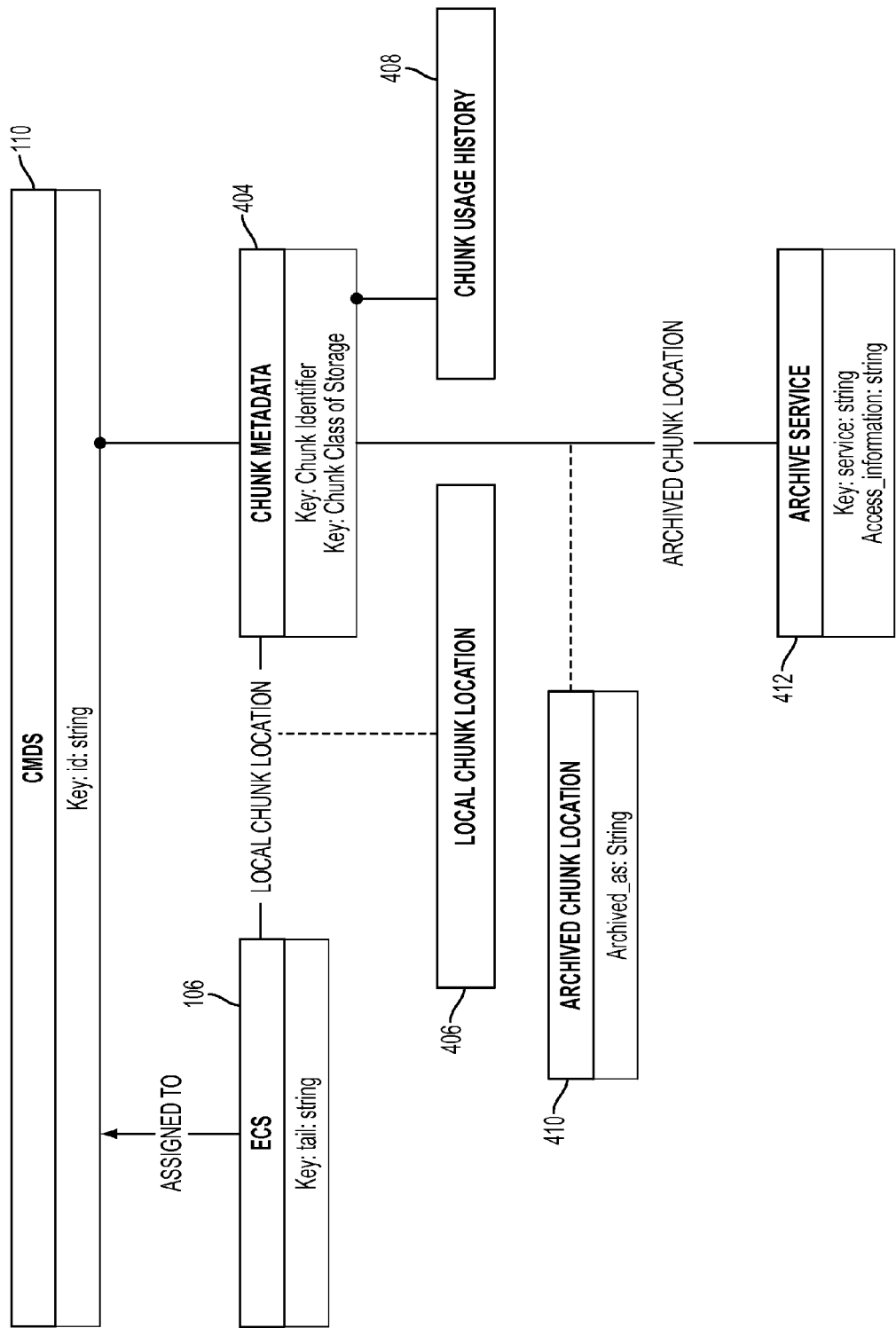
FIG. 4 is a block diagram of how the metadata files are maintained by each CMDS.

FIG. 4 is a block diagram of metadata files maintained by each CMDS 110. For each known chunk, a CMOS 110 maintains local file system metadata for a chunk file with a name derived from the chunk class of storage and permanent chunk identifier. In one embodiment these are stored in a directory for each chunk class of storage. The metadata 404 for each chunk file includes the following information.

A list of ECSs 106 within the local zone known to store this chunk. This identification uses the permanent identifier for a server within a zone and not any L3 address associated with the server; a list of external archived chunks 410, specifying the file name used when this chunk is archived and the archive service 412 used to store this chunk; aggregated chunk usage history data 408 as gathered from the ECS 106 for this chunk.

Figure 5:
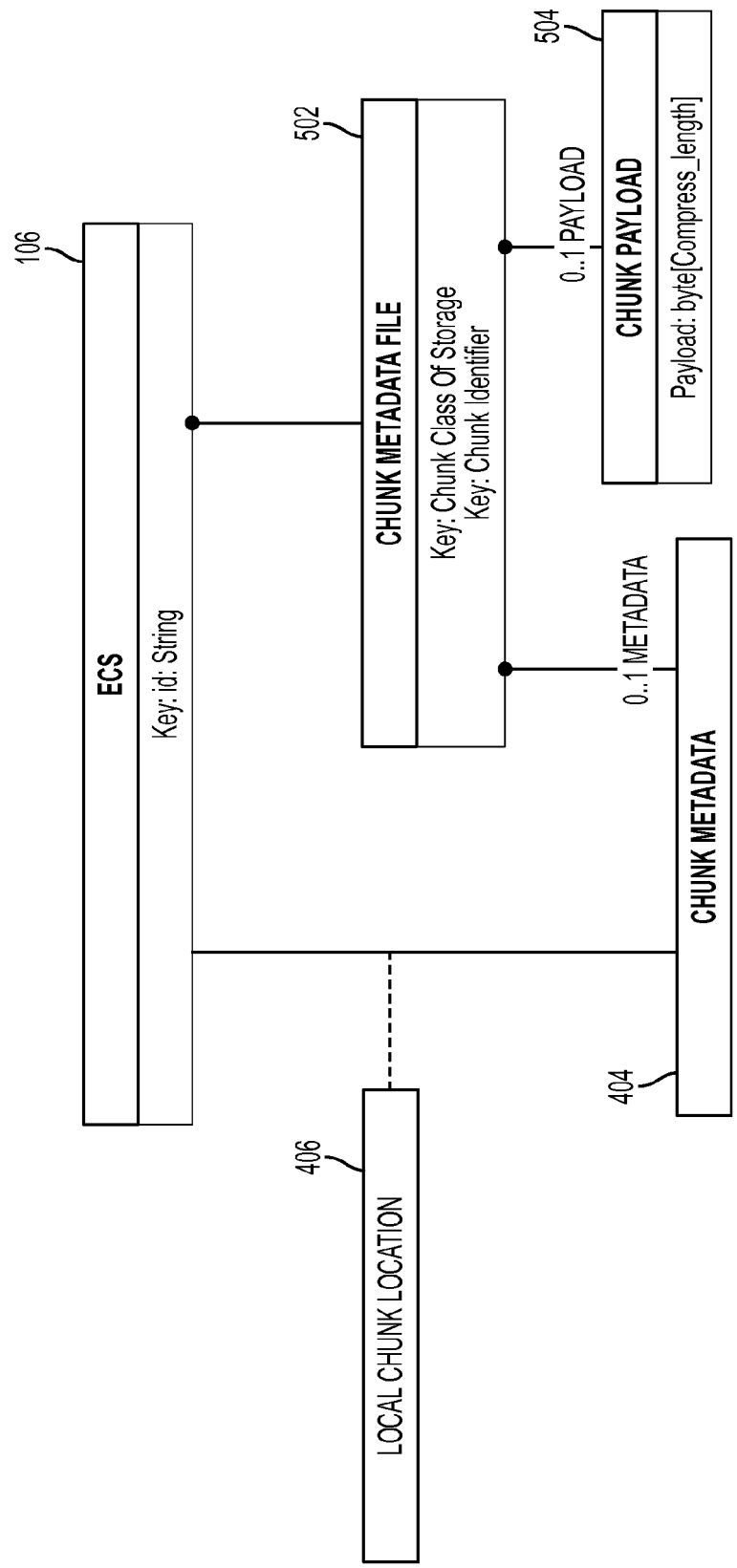
FIG. 5 is a block diagram of how the chunk files maintained by each ECS.

FIG. 5 is a block diagram of the chunk files maintained by each ECS 106. The ECS 106 names chunk metadata files 502 based upon the chunk class of storage and permanent chunk identifier. The chunk metadata file 502 typically stores the compressed payload 504 of the chunk as its data. However, the CMOS 110 may have ordered the data to be truncated to save space on this ECS 106. In the alternative, the chunk metadata file 502 may have been created without the data being present after the ECS 106 has been enabled or re-enabled, and the cloud storage system already has many chunks which must be copied to this ECS 106.

When there is no data stored for a chunk metadata file 502, the ECS 106 must issue a referral to another ECS. The other ECS may be encoded in the metadata 404 for the chunk file along with a selection weight for each local chunk location 406. When no chunk referrals are encoded, the ECS 106 will have to query the CMOS 110 to determine an alternate location for the requested chunk.

In one embodiment of the present invention, the CMOS 110 is not instantiated as a distinct server. Instead it is a role assumed by one of the ECSs within the zone. When also acting as a CMOS 110, or as a backup CMOS 110, an ECS 106 will store the location data for each chunk as metadata of the ECS chunk. The CMDS 110 location data is a superset of the chunk metadata file 502.

A system and method in accordance with the present invention relies upon the ability of an OMDS 108 to create a session for a CSAM 102, that reliably identifies the session to both the OMDS 108 and the ECS 106 that the OMDS 108 has enabled for this session. Further, the CSAM 102 must be able to re-establish connections that will belong to the same session, while third-parties are effectively prevented from impersonating the CSAM 102 and improperly attaching a connection to the session. A variety of algorithms may be used to implement this type of multiple connection multi party session. It is described here because of the necessary context it provides for the components of the present invention.

Figure 6:
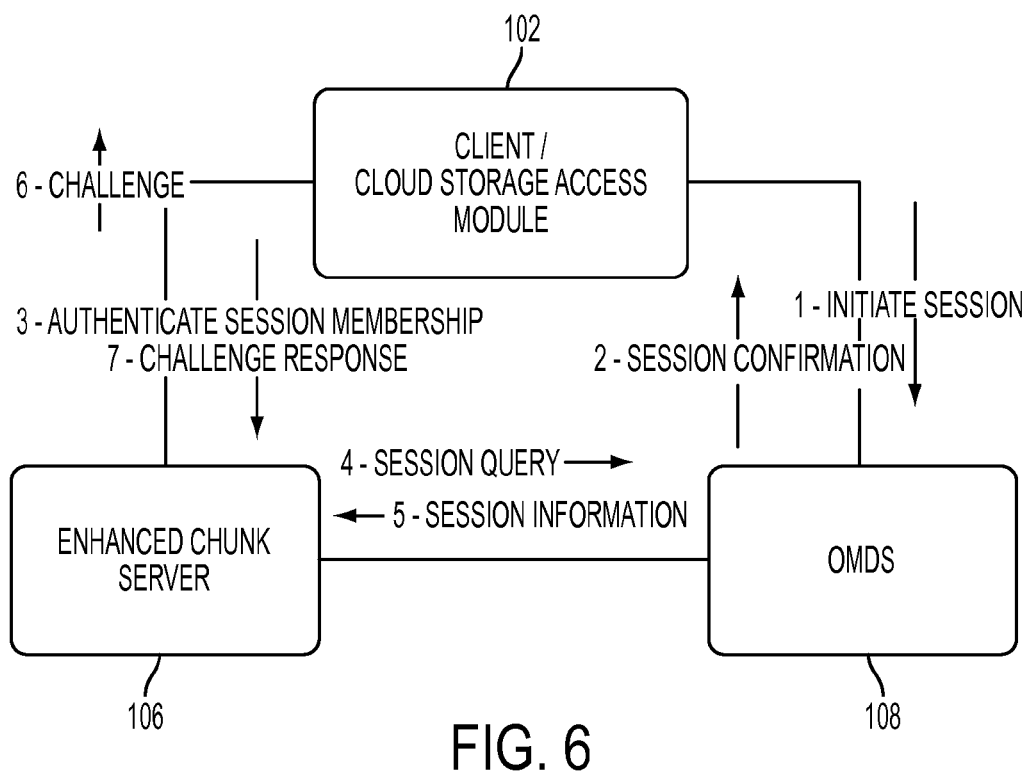
FIG. 6 is a block diagram of one method of implementing a multiple-connection multi-party session.

FIG. 6 is a block diagram of one method of implementing such a multiple-connection multi-party session.

CSAM 102 initiates a session using a secure reliable connection with its currently designated OMDS 108.

The OMDS 108 then establishes a unique session handle that will enable ECS 106 to identify the issuing OMDS 108, a session key that is unique for this session and selects a set of ECS 106 in the local zone that this CSAM 102 will be authorized to interact with. It confirms the session over the reliable connection with the CSAM 102 providing the session handle and completing any steps required to establish the shared session key. Each of the identified ECS 106 is identified by its permanent ID independent of any current L3 Addresses and L4 ports.

The CSAM 102 then establishes a reliable connection with the identified ECS 106. The CSAM 102 supplies the session handle it receives from the OMDS 108. This connection does not need to be a secure connection.

The ECS 106 then uses the session handle to determine which OMDS 108 is anchoring the session, and uses a secure reliable connection to obtain the session key from that OMDS 108. In the preferred embodiment there is a single reliable secure connection between each ECS 106 and each OMDS 108 within a local zone. Once established it remains open as long as both end points continue running.

Session information is then shared between the OMDS 108 and ECS 106.

The ECS 106 then issues a challenge to the CSAM 102.

The CSAM 102 then responds to the challenge with a response that is encrypted using the session key. This confirms that this is actually the CSAM 102 and the connection can be treated as part of the session.

Alternately a CSAM 102 may establish a secure reliable connection with the ECS 106 and supply both the session handle and session key. The ECS 106 can obtain the correct session key as previously described, and compare the results.

Establishing a session with an OMDS 108 will also establish a contextual prefix on all object-names referenced within that session. Conventional cloud storage systems frequently refer to the enclosing contextual prefix as a "bucket" and/or an "account".

Figure 7:
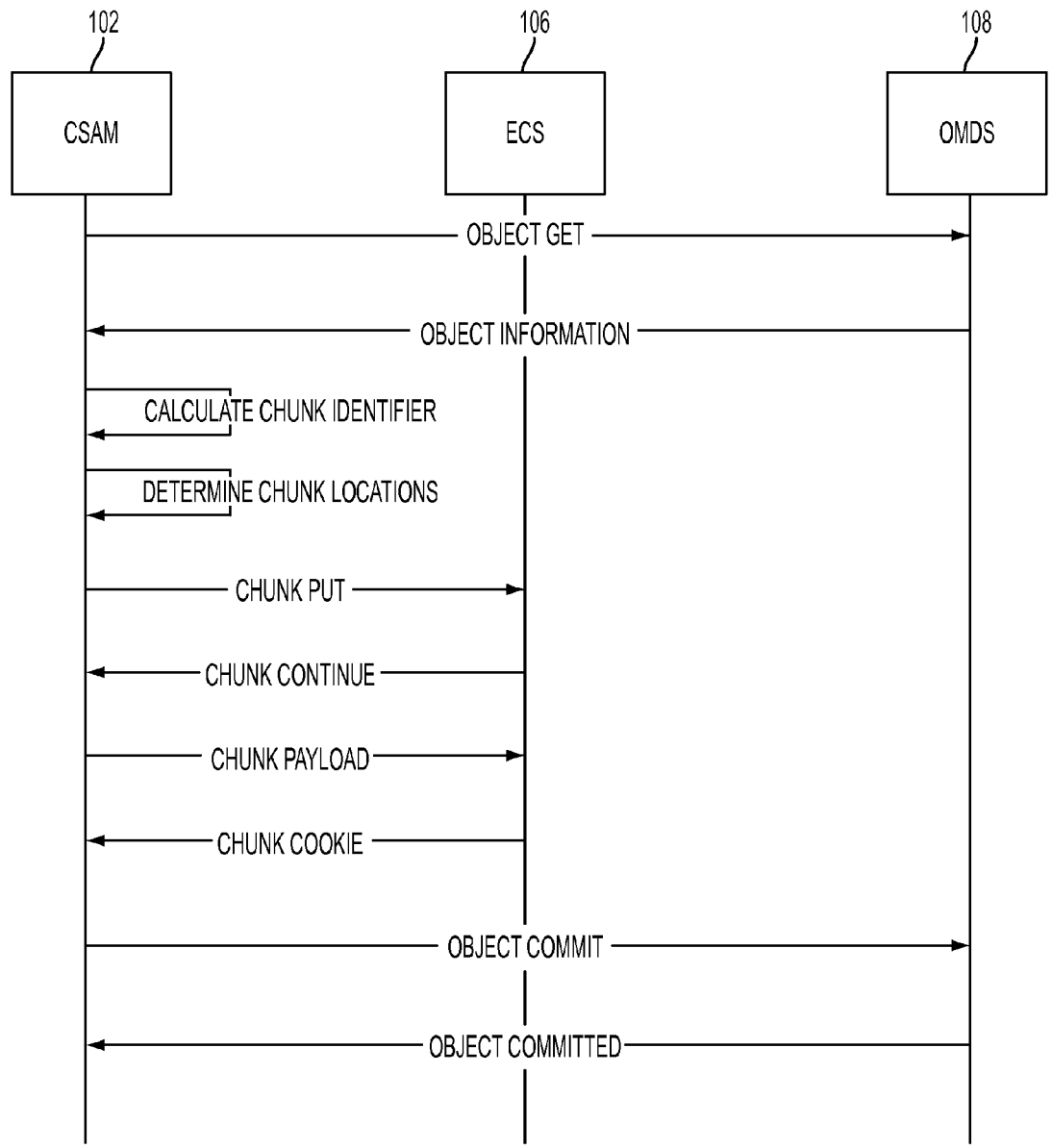
FIG. 7 is a block diagram of an illustrative example of the steps involved in a simple put transaction using a permanent chunk identifier.

Another aspect of a system and method in accordance with the present invention is support for put transactions. FIG. 7 is a block diagram of an illustrative example of the steps involved in a simple put transaction. The steps for a simple put transaction are:

A. Object Get (optional): The CSAM 102 may determine the current version number of the CSS object being put or place a lock on claiming the next version for this object with the designated OMDS 108. In the simplest version of a put interaction the step of referencing the current version of an object may be completely omitted.

B. Object Information (optional): If an object get request was made, the OMDS 108 will return the resulting object information. This will include the object version obtained if necessary from the home OMDS 108 for the object. The CSAM 102 does not use all of the information returned; it does not perform, for example, chunk get operations to obtain the current object payload.

C. Calculate Chunk Identifier: The CSAM 102 may supply either a permanent or a deferred chunk identifier. This sequence assumes that a permanent chunk identifier has been selected. The CSAM 102 determines the chunk identifier that will identify a segment of an object to be put.

D. Determine Chunk Locations: For each of the chunks generated, the CSAM 102 then determines the ECS 106 that it will put the chunk with. This requires performing a consistent hash algorithm on the permanent chunk identifiers.

E. Chunk Put: The chunk put requests are sent to the selected ECSs 106. If the ECS 106 wishes to achieve a minimum number of separately stored replicas before completing the transaction, it may determine the secondary locations for the permanent chunk identifier and send chunk put requests to those locations as well.

F. The chunk put request may include an immediate flag that indicates the chunk payload will follow immediately. If this option is not selected the ECS 106 will respond in one of the following ways: (1) Chunk Cookie: If the ECS 106 is aware that the specified permanent chunk identifier is already stored in the cloud storage system, it will respond with the chunk cookie referencing the existing chunk. The chunk cookie encodes the permanent chunk identifier, context information supplied with the chunk put request, the Session Handle, and the ECS 106 identity. (2) Chunk Referral (not pictured): Alternately, if the ECS 106 does not know that this is a duplicate chunk but does not have the capacity to store the chunk, it will issue a chunk referral response telling the CSAM 102 to put the chunk to an alternate ECS 106. (3) Chunk Continue: Typically the ECS 106 will respond with a chunk continue message telling the CSAM 102 that it is ready to accept the chunk payload.

G. Chunk Payload: If a continue response was received or the immediate option was selected, the CSAM 102 supplies the requested chunk payload.

H. The ECS 106 will validate the received payload by determining whether it calculates the same permanent chunk identifier for this payload. The ECS will respond in one of the following ways: (1) Chunk Invalid (not pictured): If the calculated permanent chunk identifier did not match a chunk invalid error response is returned. (2) Chunk Cookie Otherwise, the ECS 106 will respond to the chunk payload with the chunk cookie.

I. Object Commit: When the required chunk puts have been successfully completed the CSAM 102 commits the entire put to its OMDS 108. The commit request indicates whether the current version was either looked up or locked.

J. Stale Update Error (not pictured): If the version number was previously fetched, but not locked, and it is no longer the current version number, the OMDS 108 will respond with a stale update error.

K. Object Committed: If not previously locked, the OMDS 108 allocates the next version number from the object's home OMDS 108, as will be described in detail later in this document. The OMDS 108 confirms that the prior object metadata file has been completely put. When performing an append operation it reads the object metadata file. The OMDS 108 puts the new object metadata file, updates the current reference for the object to reference the newly put object metadata file, and then closes that object metadata file. The OMDS 108 acknowledges the commit transaction with an object committed message.

If an OMDS 108 or OMDS 108 proxy dies while holding a new version of an object without completing the transaction by closing the new object metadata file, the home OMDS 108 server will copy the prior version to supply a readable object metadata file when the session aborts while holding an incomplete new object metadata file.

Figure 8:
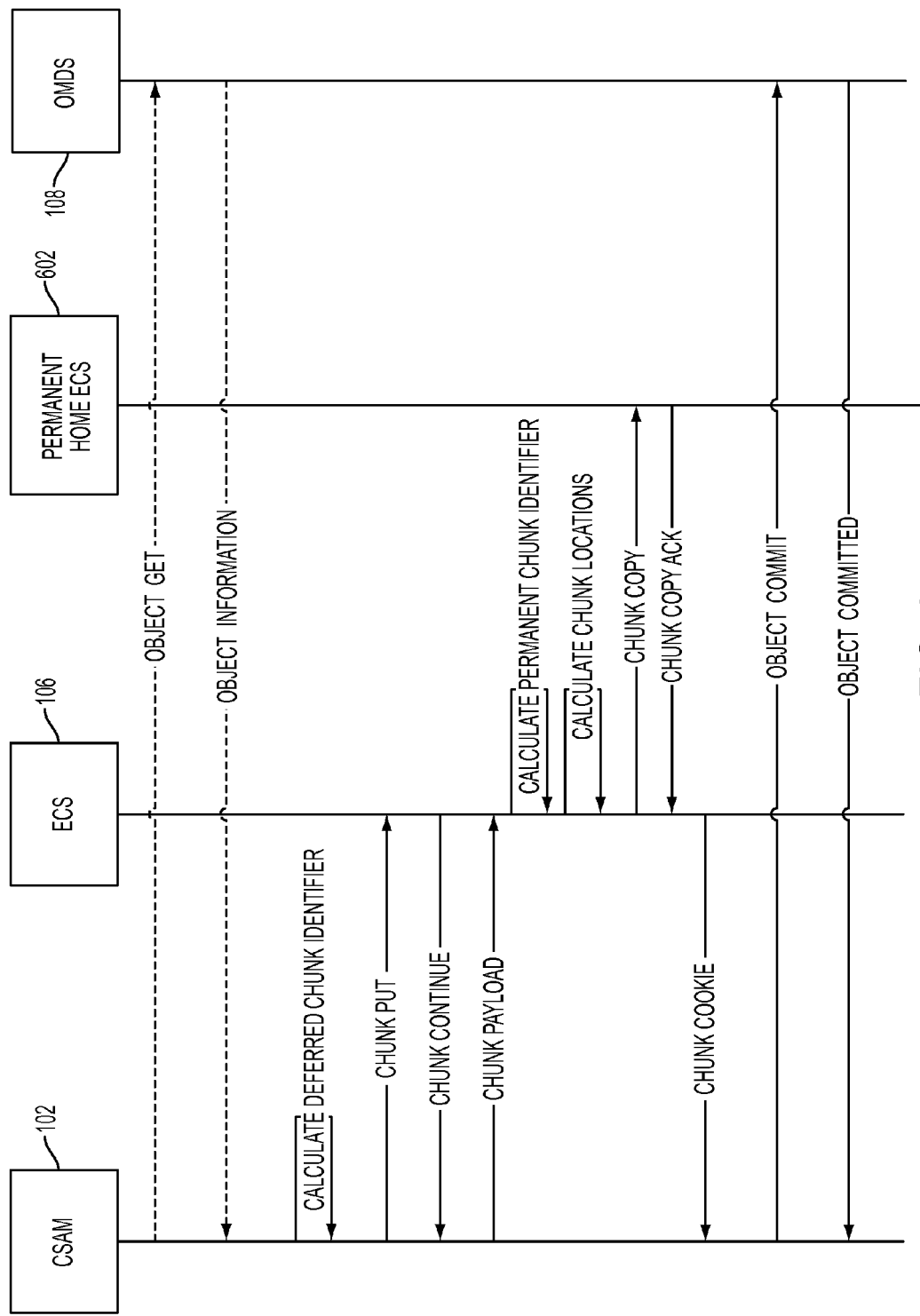
FIG. 8 is a block diagram of an illustrative example of the steps involved in a simple put transaction using the deferred chunk identifier option.

FIG. 8 is a block diagram of an alternative put transaction where the CSAM 102 uses a deferred chunk identifier. The key changes as compared to FIG. 7 are as follows:

A. The ECS 106 calculates the chunk identifier under both the deferred and permanent algorithms in order to confirm that the payload was received correctly, and then to determine what the permanent chunk identifier should be.

Figure 9:
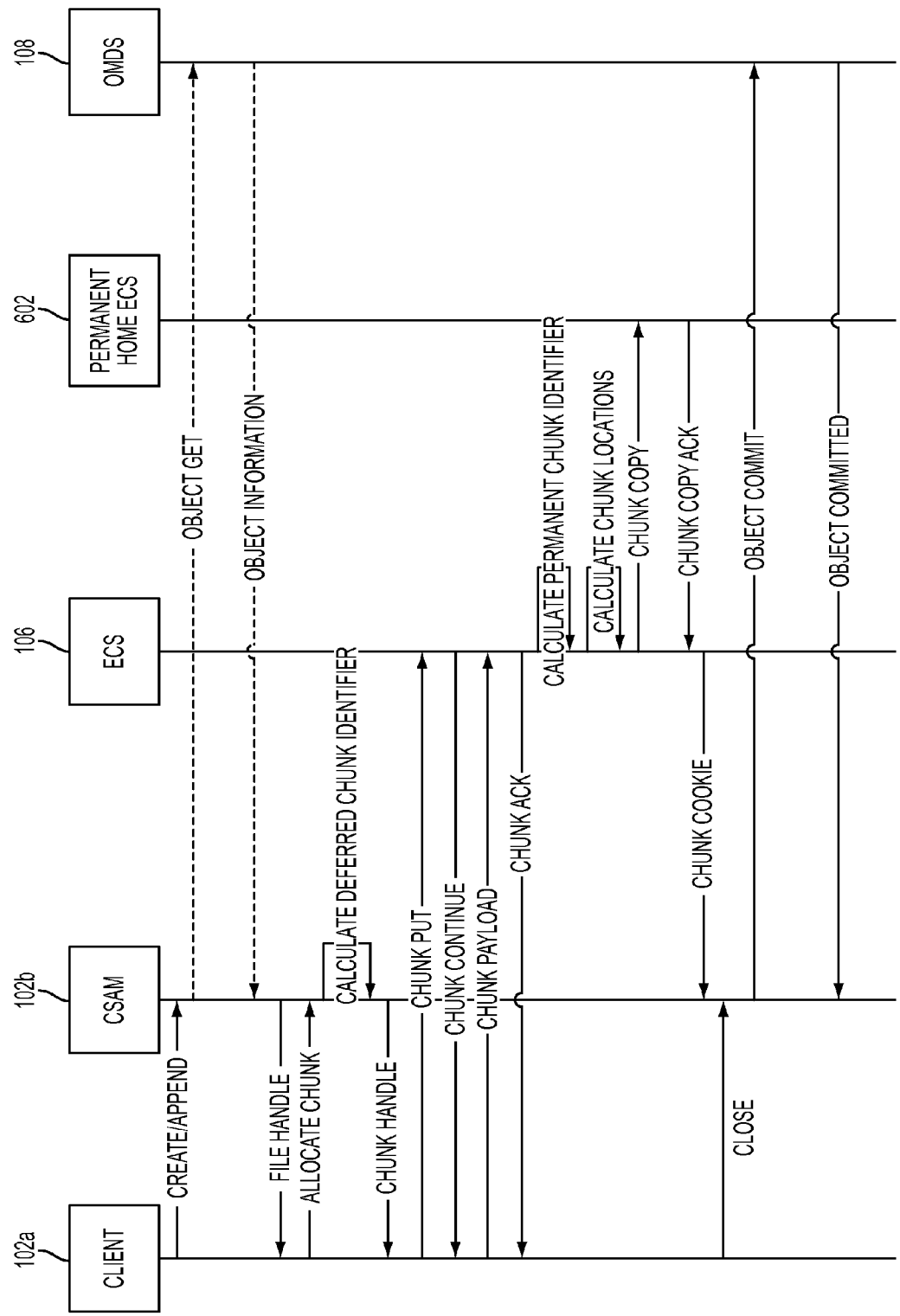
FIG. 9 is a block diagram providing an illustrative example of the step involved in a put transaction from an external client with a CSS-protocol that explicitly exposes ECSs.

B. After determining what the permanent chunk identifier should be, it determines the locations that the consistent hash algorithm requires and performs chunk copy operations to those servers. It may do this either before or after sending the chunk cookie depending on how the system has been configured FIG. 9 is a block diagram providing an illustrative example of the step involved in a put transaction from an external client with a CSS-protocol that explicitly exposes ECSs 106.

The first step is that a client 102a opens an existing object for exclusive write access in an open/create or append request made to the CSAM 102b.

If information on the prior version is potentially required, the CSAM 102b will do an object get and wait for the returned object information.

The CSAM 102b will then return a file handle to the client 102a.

As needed, the client 102a will issue a CSS-protocol dependent request to the CSAM 102b to allocate a chunk.

The CSAM 102b will then calculate a deferred chunk identifier to use and return a CSS-protocol chunk handle. This will include the chunk identifier and the ECS 106 that the client 102a should use to put this chunk.

The client 102b will then make CSS-protocol chunk put requests to the designated ECS 106.

The ECS 106 then issues a chunk continue or equivalent as required under the CSS-protocol.

The client 106 then delivers the chunk payload to the ECS 106.

The ECS 106 then supplies a chunk ack under the CSS-protocol. Depending on the configuration this may be deferred until all replicas have been created.

The ECS 106 then calculates the permanent chunk identifier for the received chunk.

The ECS 106 then calculates which ECS in the current zone should store this chunk.

The ECS 106 then initiates chunk copy requests to the permanent home ECS 602 given the newly calculated permanent chunk identifier for this CSS chunk.

The permanent ECS 602 issues acknowledgements when they have received the chunks for copying.

The ECS 106 then supplies the chunk cookie to the CSAM 102b, which will retain it for later use.

The client 102a eventually closes its file handle in a message to the CSAM 102b.

The CSAM 102b then waits for all chunk cookies to be collected from the ECS 106 and formulates an object commit request to be submitted to the OMDS 108.

The OMDS 108 finally responds with an object committed response when the commit is complete.

Figure 10:
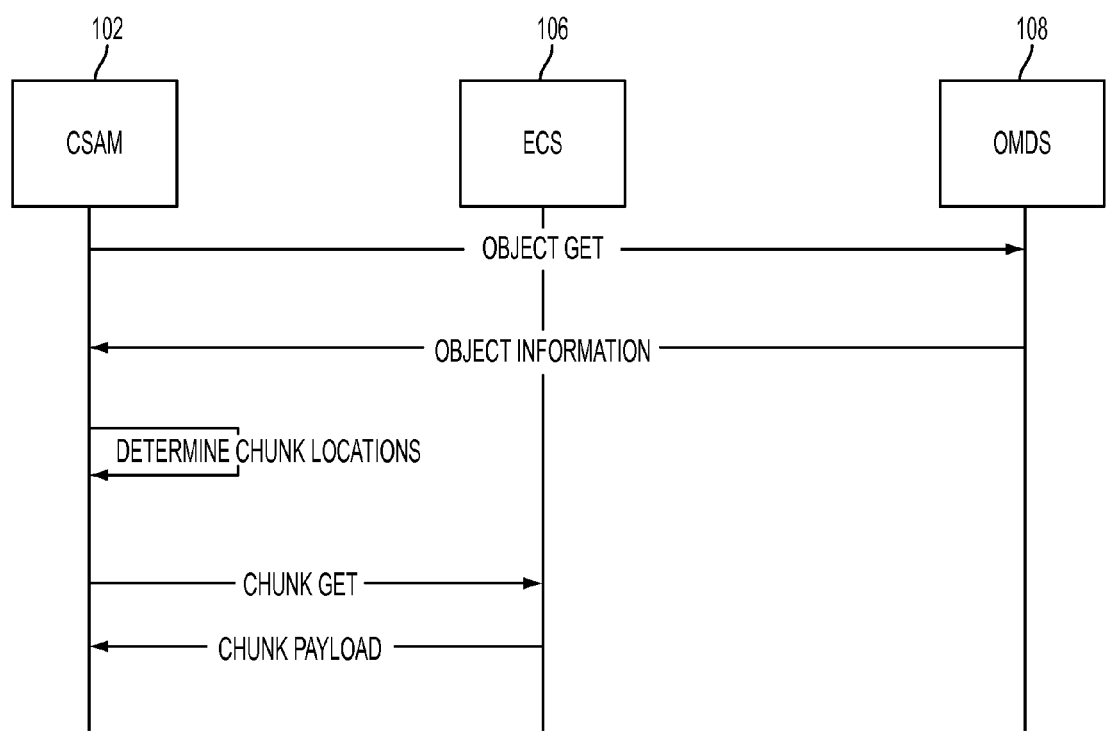
FIG. 10 is a block diagram of an illustrative example of the steps involved in a simple get transaction.

FIG. 10 is a block illustration providing an illustrative example of the steps involved in a simple get transaction:

The CSAM 102 initiates a get request transaction by sending a get request within an established session to its designated OMDS 108. This request will identify the CSS object requested, optionally specifying a specific version number. As noted in the put request sequence, this request may optionally lock the object and allocate the next version number.

The OMDS 108 responds by sending Object Information with the information retrieved from the object file 308. If no version was specifically requested, the current version is returned. The information returned includes the version number, any metadata stored for the version, and the sequence of permanent chunk identifiers with length and offset information required to recreate the object from the chunks.

The CSAM 102 then applies the consistent hash algorithm to determine which ECS 106 to issue each chunk get request to.

The CSAM 102 then sends chunk get requests to multiple ECSs 106. The CSAM 102 chooses how many requests to have outstanding at a given time. Because the chunk identifiers are a very sparse name space, the ECS 106 can process a chunk get request assuming that the permanent chunk identifier was obtained from an OMDS 108. Hostile software acting in the role of a CSAM that attempted to access chunks without going through an OMDS 108 would find it easier to guess a user identity and password than to guess an existing chunk identifier.

Each get request will be responded to in one of the following ways:

Chunk Payload: the requested chunk is delivered. The ECS 106 will have validated that the chunk payload is compatible with its permanent chunk identifier.

Chunk Referral (not pictured): An alternative ECS is identified that the CSAM 102 should fetch this CSS chunk from. The chunk get request to the alternate ECS will indicate that this is a referral, so that the alternate ECS 106 can avoid creating a referral loop. The ECS 106 may have obtained this information from the CMOS 110, if it was not stored locally.

Chunk Invalid (not pictured): An unrecoverable error has occurred. This would be a very exceptional occurrence, but could occur should an administrative decision have been made to expunge the requested data between the time that the get request was received and the chunk get was issued. There is also no way to prevent data loss from an exceptional sequence of hardware failures where replacement units are not provided rapidly enough.

Figure 11:
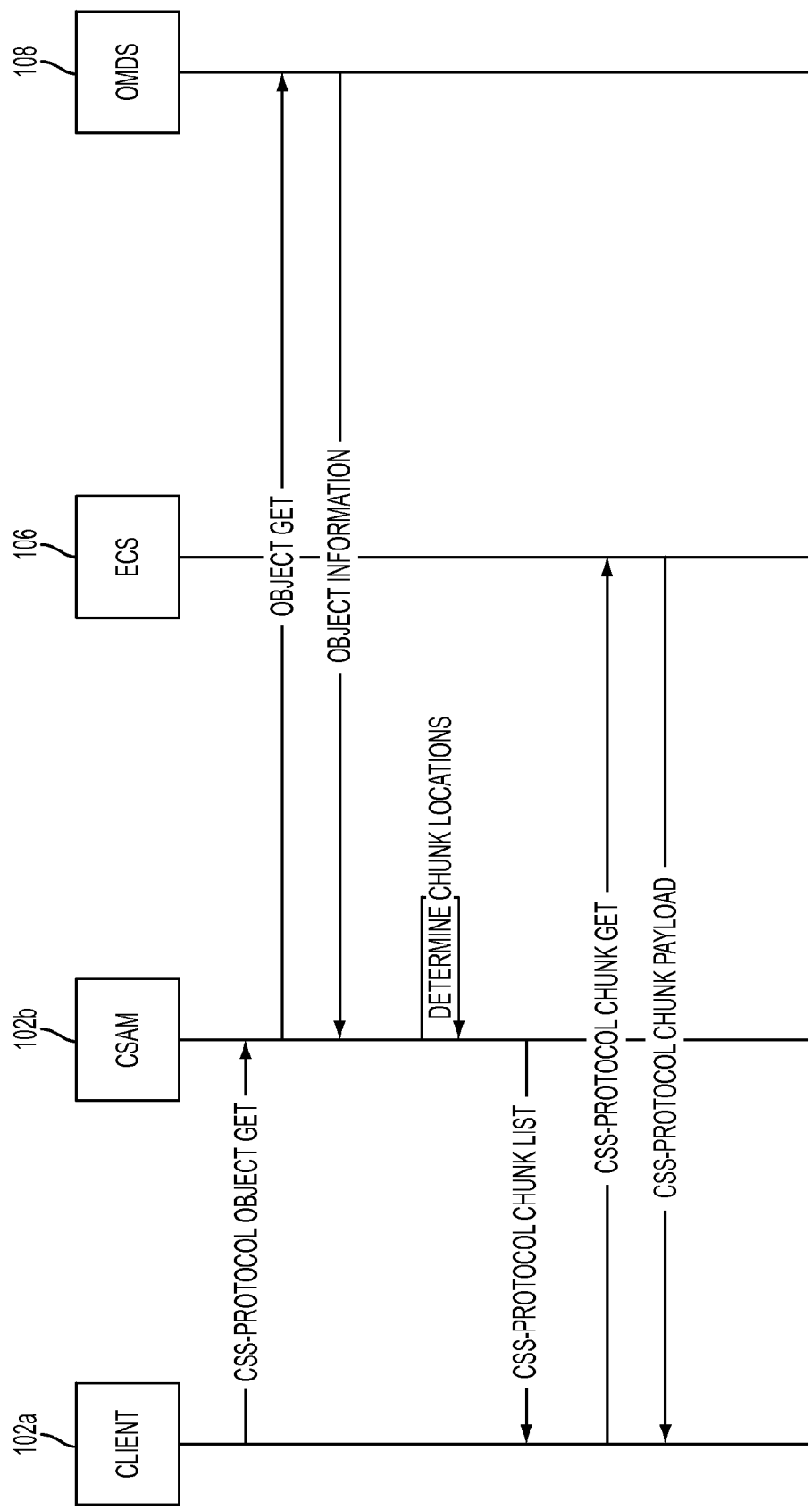
FIG. 11 is a block diagram of an illustrative example of the steps involved a simple get transaction where the external client is allowed to interact directly with the ECSs.

FIG. 11 is a block diagram of steps involved in a simple get transaction when the CSS-protocol explicitly identifies ECS 106 allowing the external client to directly fetch chunks from the ECS 106.

A client 102a makes an object get request to the CSAM 102b using the specific CSS-protocol (CSS-protocol object get).

The CSAM 102b then does an object get on the OMDS 108 (Object Get).

The OMDS 108 returns the object information for the object version requested (Object Information).

The CSAM 102b then determines the locations where the chunks should be stored using the consistent hashing algorithm.

The CSAM 102b then returns the list of chunks that the client 102a should fetch to build this object. This lists the chunk identifier and the ECS 106 for each chunk (CSS-protocol Chunk List).

For each CSS chunk, the client 102a makes a CSS-protocol chunk get request of the ECS 106 specified (CSS-Protocol Chunk Get). This results in one of the following responses:

If the ECS 106 does not have the CSS chunk, it must obtain the CSS chunk itself. This is necessary because the CSS-protocol typically will not include a chunk redirection response.

Otherwise, the other ECS 106 delivers the chunk payload.

Finally, whether obtained from local storage or another ECS 106, the chunk payload is returned to the client (CSS-protocol Chunk Payload).

When the CSS-protocol explicitly identifies ECS 106, a client 102a put request can also be allowed using deferred chunk identifiers. The CSS-protocol must use a transport protocol, such as TLS or IPSEC that provides sufficient protection against network data corruption. TCP checksums alone do not provide sufficient protection.

The OMDS 108 performing a put transaction (the transactional OMDS 108) can use the home OMDS 108 for an object to reliably reserve a new version number for an object. The transactional OMDS 108 can later supply the new metadata for the newly created version. The OMDS 108 can replicate the object metadata file knowing that each object metadata file is created exactly once, and that the metadata for the object metadata file will be supplied as a one-time put before the newly created metadata file is readable by other users. Accessing the prior version for read before putting the new version ensures that versions are made available in order.

In the preferred embodiment, the transactional OMDS 108 determines the home OMDS 108 for an object using the directory-path of the full object name under the distributed NAS protocol. A full object name is formed by concatenating the enclosing bucket, account, or other CSS-protocol containers with the object-name. An object-path is the portion of a full object-name that would conventionally represent the last directory enclosing a file. For example, for object-name "/a/b/c/d" in bucket "/x" the object-path would be "/x/a/b/c".

Each CSAM 102a commit request creates a new segment for an existing object, specifies a new version of an existing object, or creates a new object. In all cases a new version is created. Appending a new segment to an existing object merely includes the prior segments in the new version.

Figure 12:
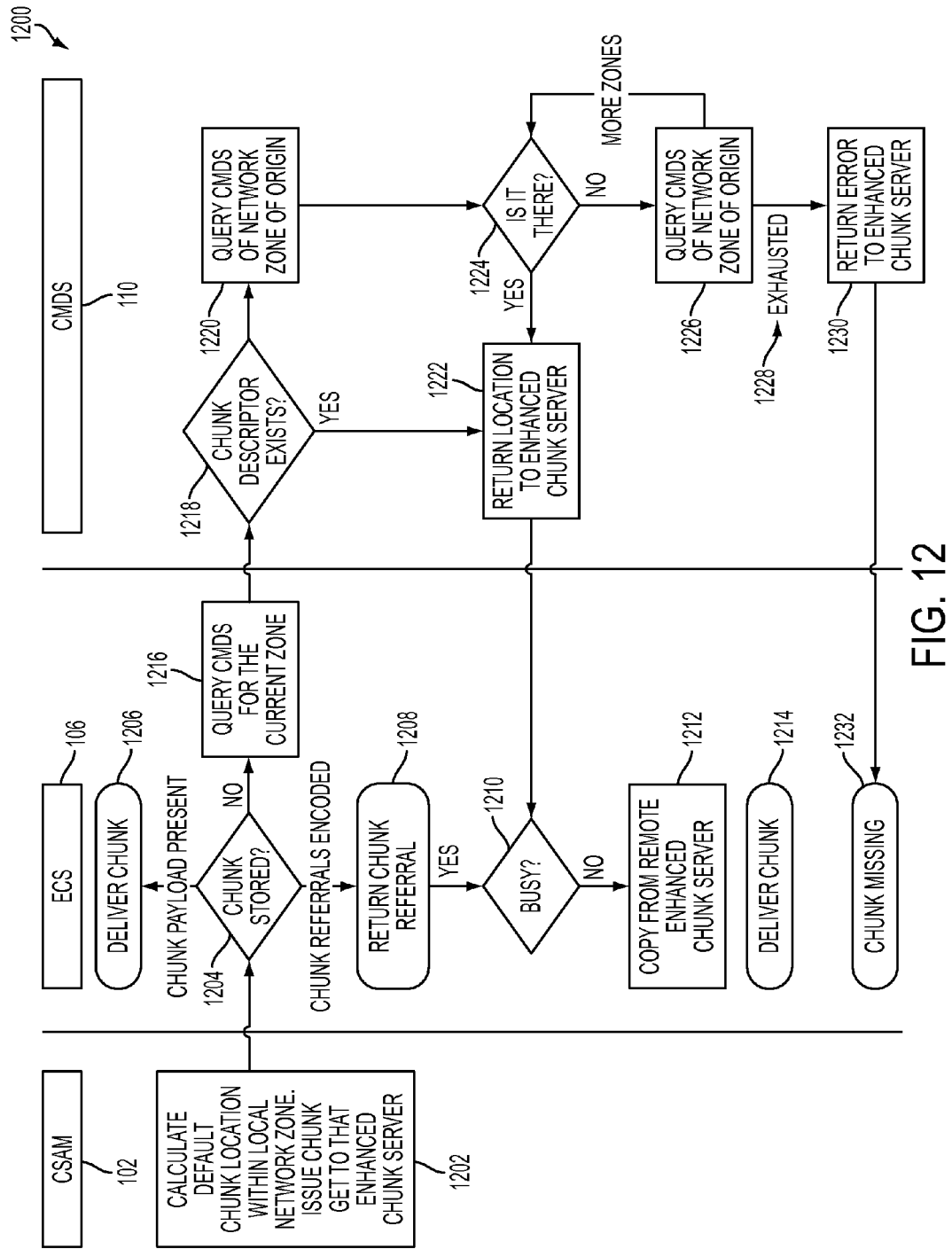
FIG. 12 is a block diagram of the process initiated by a CSAM to determine where the payload for a chunk can be found.

FIG. 12 is a block diagram of the process initiated by a CSAM 102 to determine where the payload for a chunk can be found.

A. The CSAM 102 calculates the default chunk location within a local network zone, via step 1202, for this chunk identifier, by applying, for example, a consistent hash mapping of the chunk identifier excluding the origin zone. This will yield one of the ECSs 106 within the local zone. A chunk get request is sent to the selected ECS 106.

B. The ECS 106 checks to see if it has stored the requested chunk, via step 1204.

If ECS has stored the requested chunk, it can supply the requested chunk to the CSAM 102, via step 1206.

Alternatively, if the chunk file has zero bytes of payload it means that the payload is not stored on this server. The enhanced ECS 106 must determine an alternate ECS that does have the payload for this CSS chunk, and issue a chunk referral response, via step 1208, specifying that server. This information is obtained using the named attributes of the zero-length file.

Otherwise, when there is no chunk file for the desired chunk the ECS 106 issues a chunk query to its assigned CMDS 110, via step 1216, and the sequence of steps continues.

C. The CMDS 110 determines if it has a chunk descriptor for this chunk identifier, via step 1218.

If it does, the CMDS 110 returns the location found to the ECS 106, via step 1222.

Otherwise it will begin an iterative search of other zones to determine whether a chunk descriptor can be obtained from another zone, via step 1220. This search starts with the origin zone encoded within the permanent chunk identifier. The order of the other zones is determined by a consistent hash algorithm with optional weighting. The optional weighting allows a system administrator to favor certain zones for providing backup to the alternate zones.

When a query, via step 1226, is responded to positively, via step 1224, the found location is returned to the ECS 106, via step 1222.

If the list of potential zones has been exhausted, via step 1228, the CMOS 110 must return an error indication to the ECS 106, via step 1230.

D. If the ECS 106 received the error indication, it will report the chunk as missing to the CSAM 102, via step 1232.

E. When the location is returned to the ECS 106, via step 1222, it will determine whether or not it is too busy to copy the chunk at this time, via step 1210. If it is busy, it will simply pass the remote location to the CSAM 102 in a chunk referral response, via step 1208, which will instruct the CSAM 102 to fetch the data directly from the specified alternate ECS.

F. Otherwise it will replicate the chunk from a remote ECS via step 1212. The chunk payload will be written to local storage, and then delivered to the client until the entire chunk has been copied and relayed. In the preferred embodiment, this will be a cut-through copy process. The ECS 106 will not wait for the entire chunk to be replicated before starting to provide the payload.

Figure 13:
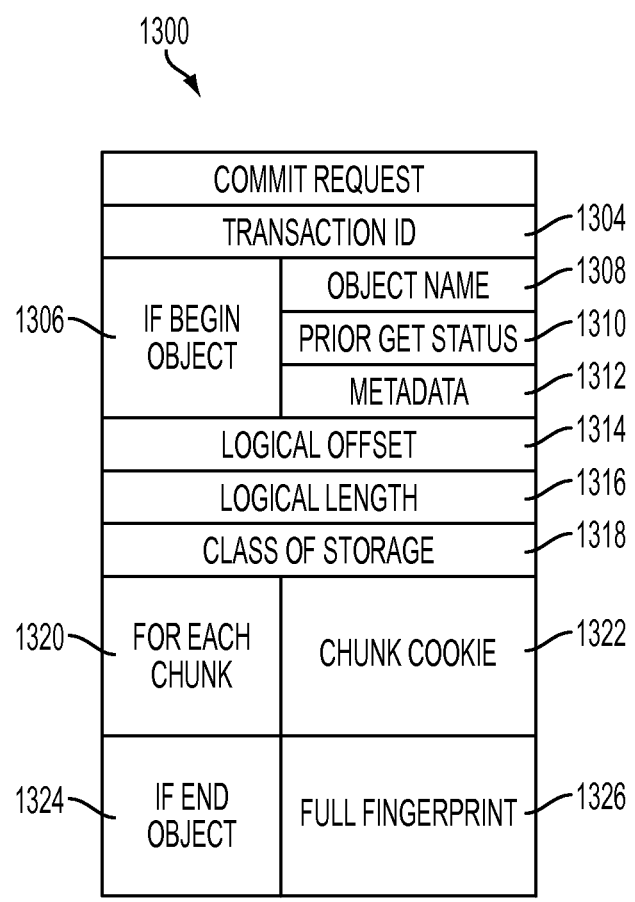
FIG. 13 is a block diagram of the fields within a Commit Request.

FIG. 13 is a block diagram of the fields within a commit request 1300.

A. Some form of session context is required, which may be an explicit handle or be implicit with an established reliable connection. In the preferred embodiment the session establishes the account and outermost container for all subsequent object references. This outermost container is conventionally referred to as a "bucket" in cloud storage systems.

B. A transaction ID 1304: An embodiment must also choose a method of signaling the beginning and end of a transaction. All puts that are part of a single transaction are visible to other sessions only after the transaction has been committed.

The transaction ID 1304 encodes the following variations of a put:

The transaction ID encodes whether the transaction is a normal, append or delete transaction. Committing with the delete option creates a version that logically does not exist for get requests.

The transaction ID encodes two boolean flags indicating whether this commit begins or end a given object within the transaction. Deletes must be complete, i.e. both begin and end flag are set.

The transaction ID also encodes whether this commit request completes the transaction.

C. If this put begins a new object, the following fields are included:

The object name 1308. This is a flat name within the context of the session. This name may include traditional directory separators.

An enumerator referencing the class-of-storage. There are numerous methods by which the meaning of each class of storage can be shared throughout the system. These include compile-time constants, system-wide configuration, and obtaining the class-of-storage definitions from a central server. Any of these methods, and more, is suitable for the present invention.

The Prior-Get-Status 1310: none, or the version that the requester assumes is the current version, or an indication that the requester has previously locked this object-name. If the version does not match, or the OMDS has no record of the existing lock, an error message will be returned.

The metadata 1312 associated with this object. If this put request includes the first segment of the object, the metadata 1312 is included for this object. The metadata 1312 for an object is a conventional element of file system design. The present invention is compatible with many different encodings of the metadata 1312 for an object.

D. Logical Offset 1314 of the segment within the set of segments being put by this request.

E. Logical Length 1316 of the data being put or appended for this segment before any data compression algorithm is applied.

F. Given the chunk size for the chunk class of storage 1318, this will require N chunks to be specified. For each of those chunks, the chunk cookie 1322 as supplied by the ECS is relayed. This cookie can be decoded by the OMDS to obtain: the permanent chunk identifier; the offset of the chunk within the set of segments being put; the compressed length of the chunk.

G. If this completes an object put, a hash is calculated covering the prior fields.

An embodiment of the present invention will typically support more than just the simple get and put requests. For example, an embodiment could include a request to put a new object version that referenced payload of other objects. Such a request would avoid the need to fetch and then restore payload. Another could be a request to return all versions starting with a supplied version number in a single collective-get request. Methods of implementing such enhanced requests should be obvious to those of ordinary skill in the field based on the data structures discussed and the exchanges documented for the basic put and get requests.

Figure 14:
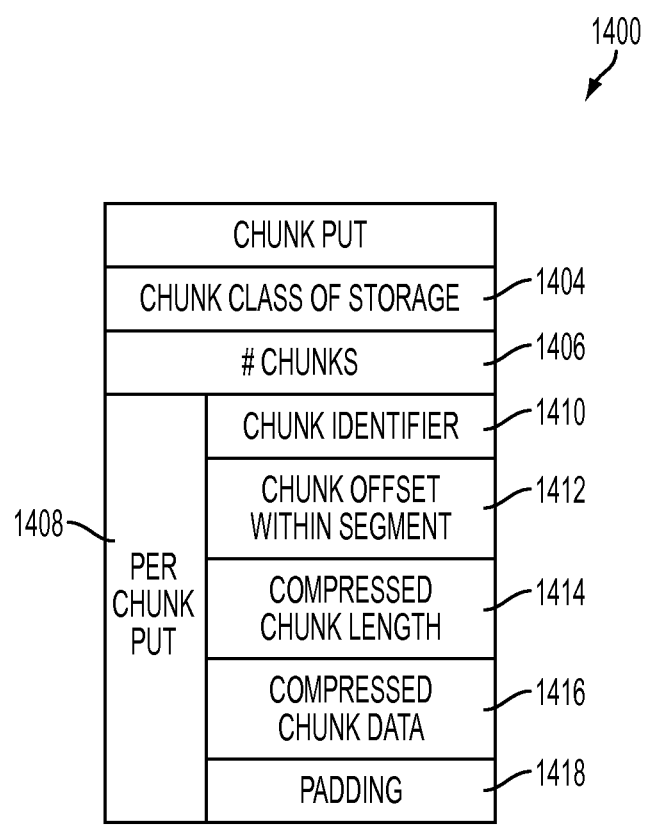
FIG. 14 is a block diagram of the fields of each chunk Put Request.

FIG. 14 is a block illustration of fields included in each chunk put 1402 request. The fields include: an enumerator identifying the chunk class of storage 1404, an optional indicator (not shown) that this is an immediate chunk put where the chunk payload will follow immediately without waiting for a response from the ECS 106, and the number of chunks 1406 to be put.

For each chunk to be put the following information is included: the chunk identifier 1410 (which may be permanent or deferred), context information for the chunk within the object segment being put (this would include a file handle and the offset 1412 within the segment), the compressed length of the data 1414, and the compressed data 1416.

5. Zero or more padding bytes 1418 to bring the chunk-specific portion to an embodiment specific alignment, typically four bytes.

The ECS 106 requires no context for the chunk other than the chunk class of storage 1404 and the chunk identifier 1410. They have no need to know which objects any given chunk is part of. They do not even need to know what compression algorithm was used for any given chunk.

When it receives a deferred chunk identifier, the ECS 106 must translate it to a permanent chunk identifier as follows:

It must validate that the deferred chunk identifier's embedded checksum matches the actual chunk data received. If it does not this indicates that there was an undetected network error and the CSAM 102 should retry the request.

It must determine whether the specific OMDS 108 associated with the session has provided sufficient chunk creation credits to allow this chunk to be created. This credit will take the form of a range of sequence numbers that the session is allowed to create. If the session does not have credit the chunk put is rejected with an error.

If the request is valid, the ECS 106 must determine the permanent chunk identifier for the chunk given the compressed chunk payload using the permanent type matching the deferred type that was selected.

If that chunk is not already stored within the zone or on this ECS 106 specifically and if this ECS 106 should store it, then the ECS 106 must store it.

The ECS 106 supplies a chunk cookie in its response to the chunk put request 1400 which encodes the permanent chunk identifier 1410, the session key for the current session, and other context information supplied in the chunk put.

The OMDS 108 uses the chunk cookie to validate that the chunks listed in an object commit request are actually stored on an ECS 106, and that the CSAM 102 has consistently referenced these chunks as being part of a CSS object.

Figure 15:
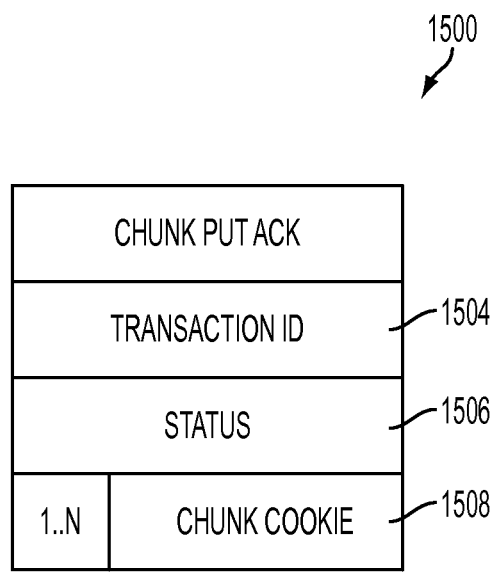
FIG. 15 is a block diagram of the fields within a chunk Put Ack.

FIG. 15 is a block diagram of fields within a chunk put ack 1500. These fields include a Transaction ID 1504 as relayed from the chunk put, the status 1506 reflecting the result of the chunk put, and for each chunk put the chunk cookie 1508.

As is conventional for sessions, the client may also abort a transaction either explicitly or by terminating the session. Failure to re-establish at least one connection within a configurable time limit will implicitly terminate a session. When a transaction is aborted, the OMDS 108 will erase any temporary files it has created for the transaction. However, any chunks created for this transaction will not be immediately deleted. Because of the split of the metadata, neither the CMDS 110 nor ECSs 106 can quickly determine that a chunk existed only for a session. The orphan detection procedures outlined later will describe how these chunks are eventually deleted.

The OMDSs 108 maintain the metadata about CSS objects. A CSS object's metadata is encoded in a local file system in a directory with a name mapped from each fully qualified object-name. This will require replacing the directory separator character used in the local file system with an alternate, typically replacing "/" with "\".

When a new version of a CSS object is committed, the OMDS 108 performing the transactions uses the following steps:

A. Atomically allocate the new version number for the CSS object. In the preferred embodiment this is done using a distributed NAS protocol by creating a new object metadata file for the new version number exclusively in the object's directory on the home object metadata server for this CSS object. Alternately an embodiment could define a special transaction to allocate a new version number that would be made of the OMDS 108 that was the designated home for the object directory.

B. The OMDS 108 performing the transaction then reads the prior version's metadata. The prior version is the version immediately preceding the version number just allocated, which may be greater than the current version number when the commit transaction was initiated. This read will not be able to complete until the prior version has been fully put. Retrying the read transaction may be required.

C. Put the object metadata to the home OMDS 108 for the object.

D. Close the object metadata file. The creator of the next version will not be able to read this version until this step has been completed.

The OMDS 108 that is the home for the CSS object just updated will then replicate the object metadata file to the other OMDS 108. This will indirectly replicate the derived directories as each OMDS 108 creates them in response to the same object metadata file.

Figure 16:
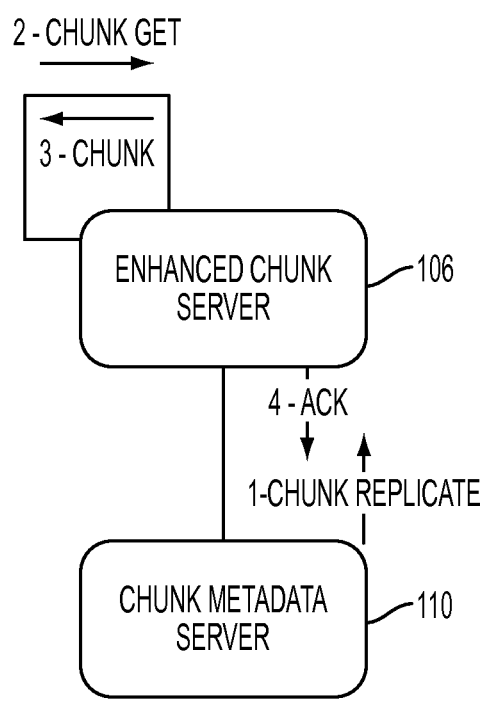
FIG. 16 is a block diagram of one method of how an ingested chunk can be replicated by the ECS and the CMOS.

FIG. 16 is a block diagram of how an ingested chunk can be replicated by the ECS 106 and the CMOS 110.

1. The CMDS 110 determines the need to replicate a chunk from a source ECS 106 to a destination ECS 106. This may be based upon receiving a new chunk descriptor from an ECS 106, the addition of an ECS 106, or the loss of an ECS 106. In response to any of the above, the CMOS 110 determines the need to replicate and issues a chunk replicate command to the destination ECS 106.

2. The destination ECS 106 does a get chunk to obtain the chunk form the source ECS 106.

3. The requested chunk is delivered.

4. The destination ECS 106 acknowledges completion of the migration to the CMDS 110.

Figure 17:
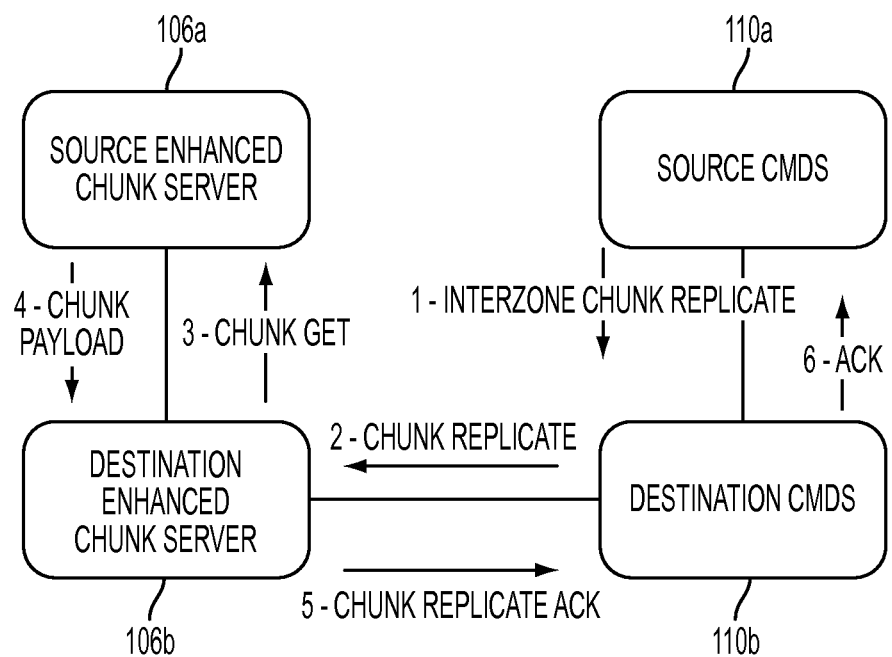
FIG. 17 is a block diagram of one method for the chunk metadata servers to replicate chunks between zones.

FIG. 17 is a block diagram of one method for the CMOSs 110 to replicate chunks between zones.

1. One of the CMDSs 110 reacting to a new chunk descriptor, or the addition or the loss of a zone, determines the need to replicate a chunk from to a destination zone It selects one of its local ECSs 106 as the source ECS 106a, and then issues an inter-zone chunk replicate command to the destination CMDS 110b.

2. The destination CMOS 110b then selects one of its ECS 106a and 106b to receive the chunk. This should be one of the ECSs 106a and 106b that would be selected by the hash algorithm within the destination zone. The destination CMOS 110b issues a chunk replicate command to the destination ECS 106b.

3. The destination ECS 106b does a chunk get to obtain the chunk form the source ECS 106.

4. The requested chunk is delivered.

5. The destination ECS 106b saves the chunk, but with the local zone as the origin, and then acknowledges completion of the migration to the destination CMDS 110b. It then acknowledges the replicate completion to its CMOS 110a or 110b.

6. The destination CMOS 110b will repeat steps 3 through 5 to create multiple local replicas within the destination zone. Once that has been achieved the destination CMOS 110b acknowledges completion to the source CMOS 110a.

One challenge posed by the present invention's split handling of cloud storage system metadata is preventing inconsistencies between the metadata dealing with objects and versions and the metadata dealing with chunks. The present invention uses a three-fold strategy to prevent such conflicts.

First, there is the mechanism of permanent chunk identifiers. The present invention does not have to track chunk versions or deal with synchronizing updates to chunk replicas. This is because unlike conventional cloud storage systems a given chunk identifier maps to at most one set of bytes. The ECS either has that chunk stored, or it does not. There is no such thing as an old version of a chunk.

Secondly, a system and method in accordance with the present invention avoids relying on the CSAM 102 alone to construct object metadata. Chunks are identified to the OMDS 108 with chunk cookies that must be signed by the ECS 106 for the specific user session and include context information for the object/file they are supposed to be part of. In addition to fingerprinting the whole object specification, the chunk cookies allow the OMDS 108 to guard against CSAMs 102 accidentally referring to the wrong chunk when doing a commit request.

Lastly, a mechanism of tracking chunk creation epochs enables CMOS 110a and CMDS 110b to know which chunks may still be referenced in pending transactions that have not yet been committed. A chunk delete command may be issued for a chunk after its reference count hits zero and there is no risk that it may be referenced in a pending transaction.

Another challenge posed by split handling of cloud storage system metadata occurs when a CSAM 102 has created chunks, and then fails before it does an object commit to its OMDS 108.

Figure 18:
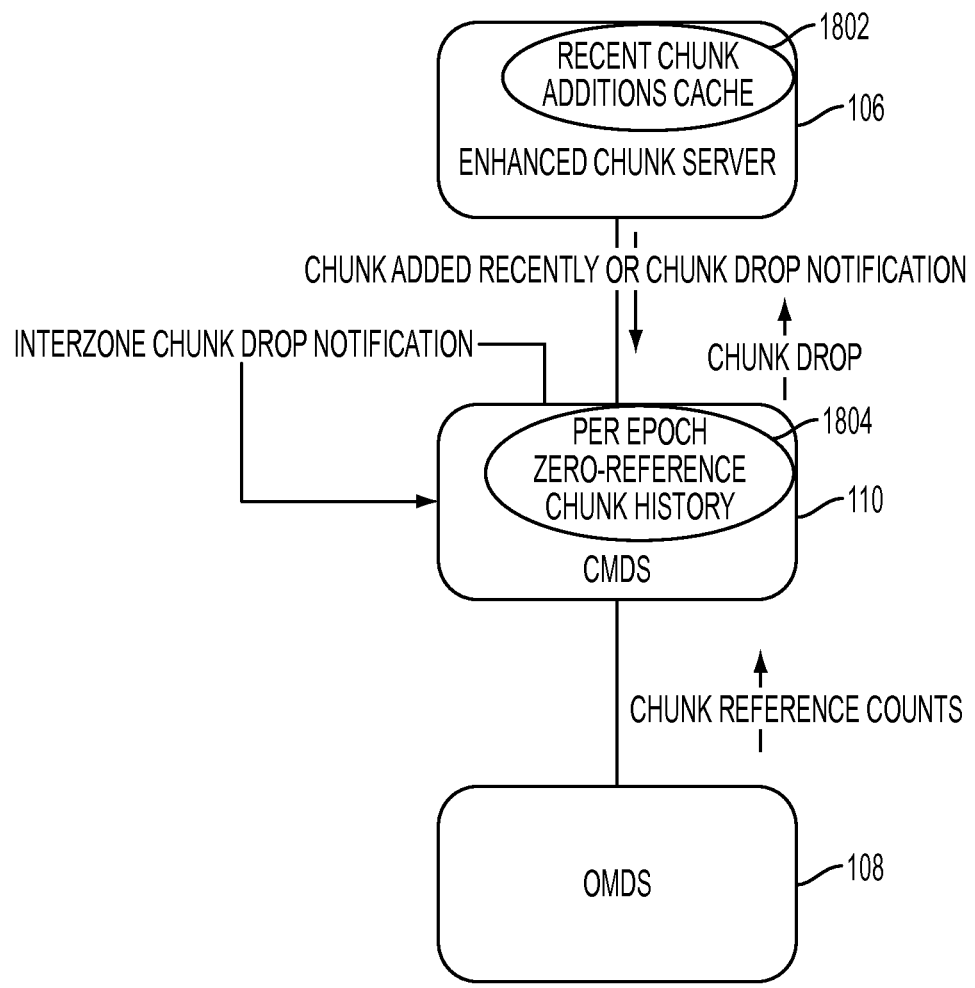
FIG. 18 is a block diagram of the exchange of messages that allow a CMOS to detect and then safely delete any orphaned chunks (i.e. those that are not referenced by any object metadata file).

FIG. 18 is a block diagram of the exchange of messages that allow a CMDS 110 to detect and then safely drop any orphaned chunks (i.e. those that are not referenced by any object metadata file).

A. Each CMOS 110 identifies candidates for chunk drops 1804, chunks which the ECSs 106 under its control are no longer required to retain. As noted previously, all permanent chunk identifiers include a zone of origin. Dropping a chunk can only be ordered by the CMOS 110 that is in control of that zone. The CMOS 110 determines that a drop is appropriate based upon monitoring the reference tracking information in the OMDS 108 published metadata file system. The reference count must be zero through multiple chunk tracking epochs. It issues a chunk drop request to the ECSs 106 where the chunk is held. This request includes the current chunk tracking epoch.

B. Each ECS 106 maintains a cache of recently added chunks 1802. When it receives a chunk drop request, it checks this cache to see if the chunk was added in the specified or a later epoch. If so, it responds with a chunk added recently error message.

C. Otherwise it may delete the chunk file and respond with a chunk drop notification.

D. Once a chunk has been dropped from all local ECSs 106, the CMOS 110 notifies the CMDSs 110 for other zones that previously asked to hold this chunk that the zone of origin for this chunk is no longer aware of any need to retain it with an interzone chunk drop notification. The other zones are then free to repeat this process to drop the chunk within their zone.

CMDS 110 may archive chunk files to an external archive service. It does so with a name that is not correlated with the chunk identifier. This location is then shared with the other chunk metadata servers and recorded in each chunk descriptor metadata file. When an ECS 106 requests the location of a chunk that is only stored on an external archive the CMDS 110 will restore the chunk before answering the ECS 106 query.

Object metadata may be backed up to external storage by creating an encrypted archive that encodes a set of object metadata files. When a request for an archived version is made the OMDS 108 will restore the object metadata file.

A client interface may support direct client connection with ECSs 106 if the API or wire protocol supports the concept of ECSs. If the ECSs 106 support the protocol, the client will access them using the existing wire protocol, and the ECSs 106 are enhanced to automatically perform the following integrity checks on each direct access.

A. The ECS 106 will only successfully complete a get operation if the fingerprint encoded in each chunk identifier matches the fingerprint calculated from the chunk payload.

B. The ECS 106 will only successfully complete a chunk put operation if the chunk identifier is a deferred chunk identifier or is a permanent identifier that matches the fingerprint calculated from the compressed chunk payload.

C. The ECS 106 will perform the steps as previously described when a chunk is put with a name that is a deferred chunk identifier.

This method relies on the existing CSS-API or CSS-protocol to require the client to relay chunk identifiers as supplied by the server (which is actually the client interface) to the ECS 106. An existing CSS-API or CSS-protocol that requires chunks to be identified in a specific fashion will not allow direct client access to ECSs 106.

When the CSS-API or CSS-protocol cannot support direct referral to ECSs 106 or a specific ECS 106 is not known to satisfy these requirements, the CSAM 102 must act as a proxy for access to the ECS 106 and then perform these validation steps itself. Alternately it may appoint another proxy to do so.

The components of the present invention may be deployed in many configurations to meet different needs. For example, the CSAM 102 may be:

A trusted component of the system that is deployed in a manner where the cloud storage system provider controls the installation and code for the CSAM 102 or otherwise has a sound basis to trust that the CSAM 102 is behaving exactly as specified. Such a trusted component will typically be co-located with the OMDS 108 it connects with. A major advantage of this option is that it requires no modification of any end client system.

An independent component that is intended to be deployed as a library in the same environments as the end client. When a client is capable and willing to have the CSAM 102 perform the fingerprinting of chunks, this model of deployment can fully optimize network traffic by avoiding the initial ingest of duplicate chunks. This deployment may be advantageous when clients are willing to install a user-mode library to enable access the cloud storage system. Use of a library enables parallel access to ECSs 106 even when the CSS API does not directly support this concept.

An independent component that functions as a proxy for the cloud storage system for a specific set of clients. It may be implemented as a distinct physical server, or as a virtual machine. Whether such an independent server would be treated as a trusted component would be dependent on how the network and virtualization were managed. This embodiment provides most of the network savings of the client library while avoiding changes to the end clients themselves. However, it requires a network and/or virtualization management infrastructure.

A given embodiment of the present invention can deploy CSAMs 102 in any combination of the above models.

While both the OMDS 108 and CMDS 110 will typically be deployed with servers deployed in each zone, the method of distributing the metadata is different for each subsystem. As will be explained in detail, control over objects is distributed by explicit management plane policy and/or configuration, while distribution of chunks is controlled by network topology and hashing.

In alternate embodiments, a system and method in accordance with the present invention may use chunk servers that have not been enhanced to validate the consistency rules regarding chunk payload and chunk identifiers. When such un-enhanced chunk servers are used, the CSAM 102 must perform the required validation itself, including validating the fingerprint of a newly written chunk.

In some embodiments of the present invention the transaction processing role of an OMDS 108 can be offloaded to an OMDS 108 proxy.

An OMDS 108 proxy accesses the object metadata file system as a caching NAS proxy. Acting as a caching proxy is simplified by the non-mutability of any given object metadata file. If the OMDS 108 proxy has a copy of an object metadata file it has the correct copy. When it does not, it can retrieve a copy from any of the OMDS 108 servers. When it is creating a new version of an object it deals with the home OMDS 108 for that object.

In the preferred embodiment an OMDS 108 proxy uses distributed NAS protocol features to subscribe for updates to the object directory for any object it is tracking. It could then fetch new object metadata files and possibly delete older version from its local cache.

When an OMDS 108 proxy is co-deployed with an ECS 106 the OMDS 108 proxy may be configured to always select the co-deployed ECS 106 as the initial target of chunk get and chunk put requests.

Figure 19:
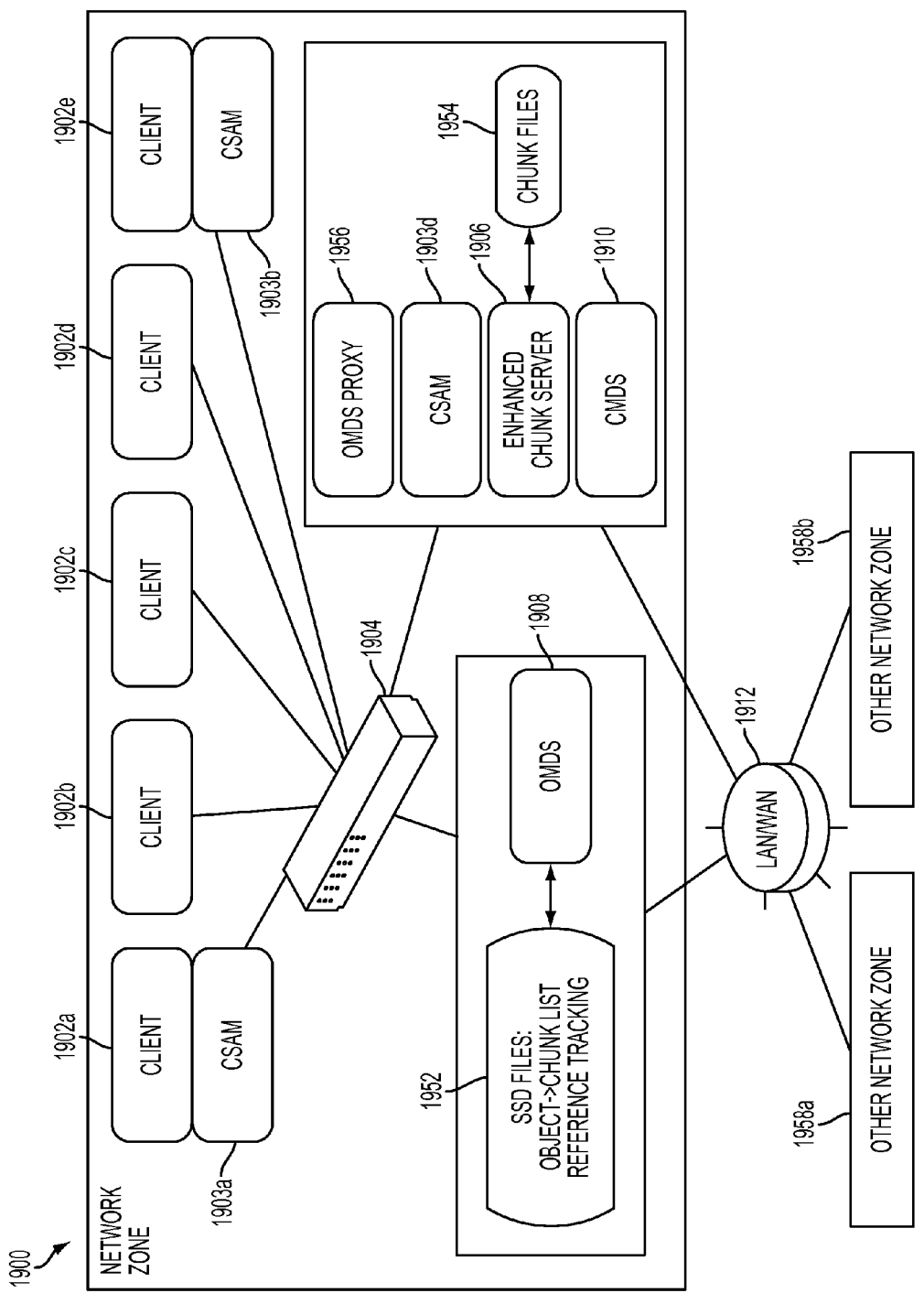
FIG. 19 is a block diagram of one method for distributing the components of the present invention with a given zone.

FIG. 19 is a block diagram 1900 of one method for distributing the components of the present invention with a given zone. In this example, the CSAMs 1903*a*-1903*d* are deployed as libraries for some clients 1902*a*-1902*e* and co-located with ECSs 1906 for users that do not want to install libraries. OMDS Proxies 1956 are co-located with Enhanced Chunk Servers 1906 and a CMDS 1910. An OMDS 1908 is deployed within each Network Zone, which maintains the OMDS metadata on SSD 1952. Network elements 1904, typically switches, connect the components within a network zone. Other network elements 1912, which may be switches or routers, connect with other network zones (1958*a* and 1958*b*).

In this example, OMDS 1908 proxies are co-located with the ECSs 1906 to distribute the transaction processing and further prevent the OMDS 1908 becoming a bottleneck. To speed the OMDS 1908 proxy transaction processing, the servers should be provisioned with some SSD storage to support caching for the OMDS 1908 proxy.

Figure 20:
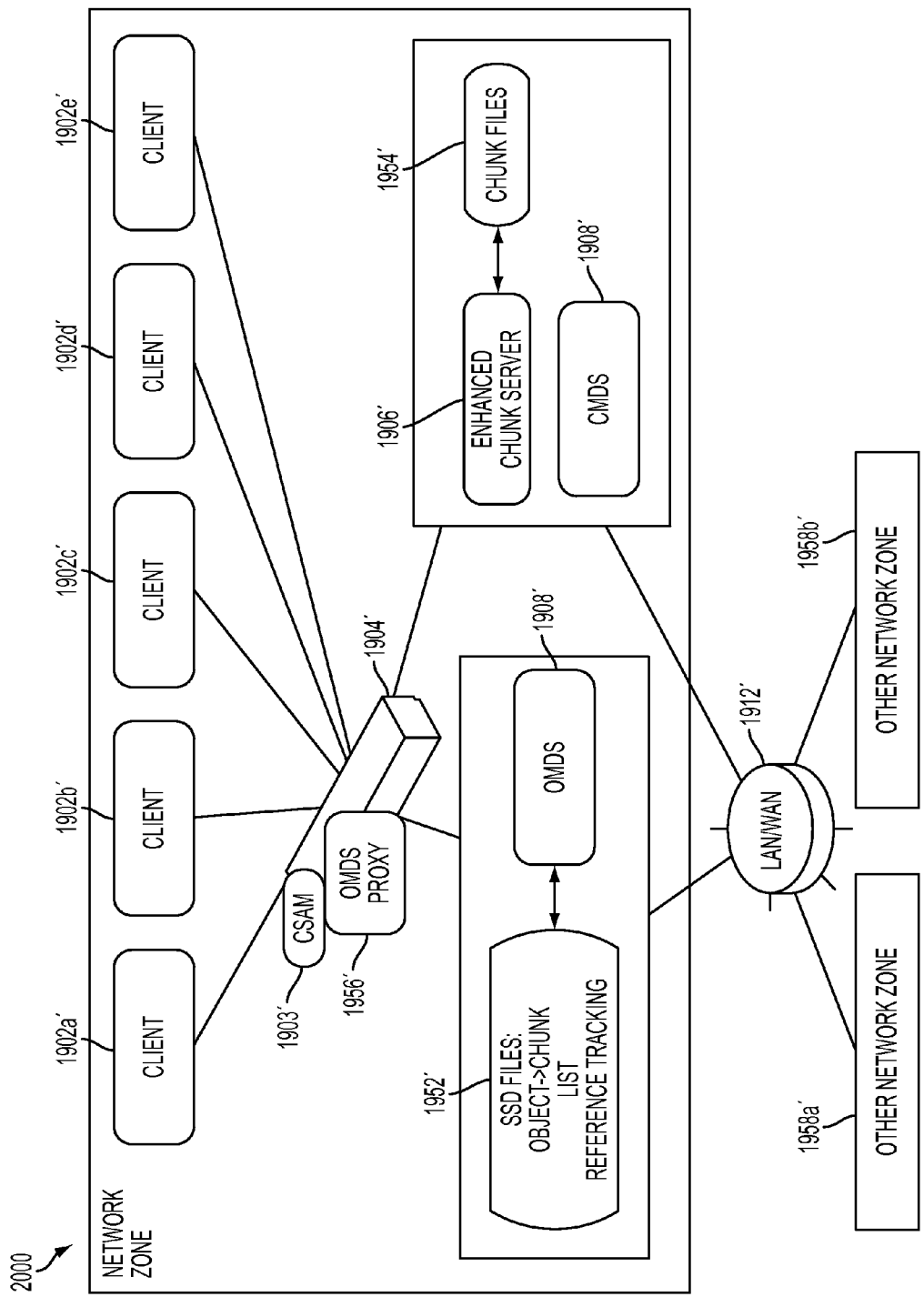
FIG. 20 is a block diagram of an alternative method for distributing the components of the present invention.

FIG. 20 is a block diagram 2000 of an alternative method for distributing the components of the present invention. In this example, the CSAM 1903*a*'-1903*d*' and OMDS 1908' proxy are co-deployed with a network switch or load balancer. This is an effective solution for supporting clients using HTTP derived protocols.

In conventional cloud storage systems the metadata server controls a large number of ECSs 1906'. This responsibility is assigned to the metadata maintenance processes in the present invention. Conventional techniques may be employed by these metadata maintenance processes to control recreation of chunk files replicas over the various ECSs 1906' after the number of available valid copies has decreased.

Existing ECSs 1906' that deal with existing CSS-protocols may be incorporated into this system by the master metadata servers only when the ECSs 1906' allow chunk files to be named by the metadata servers. When existing ECSs 1906' are incorporated into the system the enhanced functionality described in this application for ECSs 1906' must be implemented by a proxy. This proxy functionality may be provided by the CSAM 1903*a* or 1903*b* itself or any component it designates.

Benefits

A. Distribution of metadata retention and processing can both be distributed to avoid bottlenecks on either the number of metadata operations or the total amount of metadata that must be stored for high speed access.

B. High-speed storage resources supporting metadata can be applied to the active portion of the metadata rather than to all metadata.

C. A CSAM may apply local knowledge to optimize the parsing of new objects for deduplication purposes.

D. Different segments of a file may be encoded with different chunk sizes. This is valuable when there are logical portions of a file that differ greatly in size. For example, a digital music file includes a relatively short section with tags, including potentially purchase information and then a relatively large section with the actual music. The latter section benefits from larger chunks. Even when not needed within a file, selecting the optimum chunk size for each object is even more frequently valuable, and is fully supported by per-segment chunk sizes.

E. A CSAM may present a file as multiple segments to match its own buffering capacity.

F. The support of two methods for permanently identifying chunks using different quality hash algorithms for finger-printing allows the greater computational overhead of generating a cryptographic quality fingerprint to be reserved for objects with sufficient deduplication potential.

G. The option to use deferred chunk identifiers allows a CSAM to elect not to perform the fingerprinting process, but instead allow the receiving ECS to perform this operation. Deferred chunk identifiers also enable ECSs to do fingerprinting for chunks received directly from ECS aware clients.

H. Differentiation of inter-server replication from intra-server replication allows utilization of intra-server replication to a controllable extent. Generally intra-server replicas consume more local IO bandwidth, but not more network bandwidth. Inter-server replication consumes both network bandwidth and local I/O bandwidth, but provides greater protection from geographically localized problems that intra-server replication provides little protection against. An earthquake, for example, is likely to destroy multiple local replicas at once.

I. A CSAM may direct limited deduplication even without the cryptographic strength fingerprinting algorithm, by specifying existing chunks in new commit operations.

J. A CMDS does not track the location of chunks in other zones.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A computer implemented method for avoiding single metadata server bottlenecks on processing cloud storage system (CSS) object metadata, the computer executing the following operations:

dividing a metadata storage for a cloud storage system between Object metadata that encodes information on an object and versions of the object and Chunk metadata that tracks the locations of chunks;

identifying a reference to each chunk in the object metadata using a globally unique permanent chunk identifier which is never re-used to identify a different payload;

maintaining the CSS object metadata in a shared global name space, wherein the CSS object metadata is distributed over a plurality of object metadata servers (OMDS);

wherein one or more Enhanced Chunk Servers (ECS) or one or more Chunk Metadata Servers (CMDS) encode a chunk as a file named based upon a chunk class of storage and the permanent chunk identifier, wherein data of the file holds a compressed payload for a respective chunk as data, and the metadata of the file encodes the identifiers of zero or more other ECSs known to hold the payload for the respective chunk;

wherein one of the ECSs will acknowledge each valid put of a chunk with a chunk cookie that encodes the permanent chunk identifier for the chunk, the length of the chunk data after compression and context information supplied by a Cloud Storage Access Module (CSAM), usable by an OMDS to validate a commit of the object; and wherein an ECS that receives a request to put a chunk that is identified with a deferred chunk identifier will:
validate that a checksum encoded in the deferred chunk identifier is valid;
determine the permanent chunk identifier for the chunk payload;
store the chunk under the permanent chunk identifier, responsive to determining that the permanent chunk identifier is not already present; and
provide a chunk cookie as an acknowledgement.

2. The computer implemented method of claim 1, wherein end-to-end data integrity is ensured by one or more enhanced chunk servers (ECS) not accepting a chunk for storage when the chunk identifier is inconsistent with the chunk payload.

3. The computer implemented method of claim 1, wherein at least one of the OMDSs archives CSS object metadata to external storage services so that the CSS object metadata can be expunged from the local file systems and restored from an external storage system when needed.

4. The computer implemented method of claim 1, wherein one or more Chunk Metadata Servers (CMDS) archives chunks to external storage services so that they can be expunged from one or more ECSs and restored from the external storage system when needed.

5. The computer implemented method of claim 1, where each OMDS maintains the object metadata for each CSS object as metadata file within a local file system using a file name derived from a fully qualified object name.

6. The computer implemented method of claim 1, wherein the OMDSs create a global name space by publishing their object metadata files using distributed network attached storage (NAS) protocol.

7. The computer implemented method of claim 1, wherein a collective CMDS is responsible for storing and retrieving chunk metadata.

8. The computer implemented method of claim 1, wherein a permanent chunk identifier is used to permanently identify all persistently stored chunks, wherein the permanent chunk identifier is based upon a cryptographic hash algorithm that excludes the possibility of a preimage attack.

9. The computer implemented method of claim 1, wherein a permanent chunk identifier comprises a hash algorithm with a unique identifier assigned by either a CSAM or an ECS.

10. The computer implemented method of claim 1, wherein the identification of a chunk is deferred during a put transaction using a deferred chunk identifier to act as a temporary placeholder for a permanent chunk identifier.

11. The computer implemented method of claim 1, wherein each CSS object at any point in time has a designated home OMDS which is solely responsible for assigning new version numbers.

12. The computer implemented method of claim 11, wherein each CSS object is represented by an object directory in an OMDS local file system with a directory name derived from the fully qualified object name.

13. The computer implemented method of claim 12, wherein each version of a CSS object is represented by an object metadata file within the object directory with a name that encodes the version and contents that encode the set of permanent chunk identifiers to reconstruct the object and the required sequencing information for respective chunks.

14. The computer implemented method of claim 1, wherein each OMDS maintains transactional consistency of metadata derived from information in object metadata files.

15. The computer implemented method of claim 1, wherein an OMDS acts as a NAS client to access metadata files in the OMDS shared global name space.

16. The computer implemented method of claim 1, wherein a request by a requester to get a chunk that has no local payload stored for the chunk is answered with a chunk referral response redirecting the requester to another ECS that does have the chunk payload stored.

17. The computer implemented method of claim 1, wherein one of the ECSs issues a chunk referral response when it has determined that processing a get request itself would cause excessive delay.

18. The computer implemented method of claim 7, wherein an ECS will report an error when the payload read for a chunk is inconsistent with its chunk identifier.

\* \* \* \* \*